United States Patent
Miyamoto et al.

(10) Patent No.: US 9,588,017 B2
(45) Date of Patent: Mar. 7, 2017

(54) APPARATUS FOR DETECTING VARIATION ABNORMALITY IN AIR-FUEL RATIO BETWEEN CYLINDERS

(71) Applicants: Hiroshi Miyamoto, Shizuoka-ken (JP); Kenji Suzuki, Susono (JP)

(72) Inventors: Hiroshi Miyamoto, Shizuoka-ken (JP); Kenji Suzuki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 359 days.

(21) Appl. No.: 14/216,070

(22) Filed: Mar. 17, 2014

(65) Prior Publication Data

US 2014/0298889 A1    Oct. 9, 2014

(30) Foreign Application Priority Data

Apr. 5, 2013  (JP) .................... 2013-079463

(51) Int. Cl.
  *G01N 21/00* (2006.01)
  *G01M 15/10* (2006.01)
  *F02D 41/14* (2006.01)

(52) U.S. Cl.
  CPC ....... *G01M 15/104* (2013.01); *F02D 41/1495* (2013.01)

(58) Field of Classification Search
  CPC .......................... G01M 15/102; F02D 41/1495
  See application file for complete search history.

(56) References Cited

U.S. PATENT DOCUMENTS

| | | |
|---|---|---|
| 2010/0031731 A1 | 2/2010 | Kawase et al. |
| 2011/0113870 A1 | 5/2011 | Suetsugu et al. |
| 2012/0072095 A1 | 3/2012 | Shinoda |
| 2012/0109497 A1 | 5/2012 | Anzawa |
| 2012/0323466 A1 | 12/2012 | Iwazaki et al. |
| 2013/0253802 A1 | 9/2013 | Miyamoto et al. |
| 2015/0247434 A1* | 9/2015 | Hayashita ........... F02D 41/1454 60/285 |

FOREIGN PATENT DOCUMENTS

| | | |
|---|---|---|
| JP | 2005-282475 A | 10/2005 |
| JP | 2009-270543 A | 11/2009 |
| JP | 2010-038794 A | 2/2010 |
| JP | 2010-203413 A | 9/2010 |

(Continued)

*Primary Examiner* — David Gray
*Assistant Examiner* — Andrew V Do
(74) *Attorney, Agent, or Firm* — Dinsmore & Shohl LLP

(57) ABSTRACT

An apparatus for detecting a variation abnormality in an air-fuel ratio between cylinders according to the present invention is configured to calculate a value representing a change in an air-fuel ratio based on an output of an air-fuel ratio sensor that is provided in an exhaust passage in a predetermined operating state in which fuel is injected from a fuel injection valve, perform, to the calculated value, sensitivity correction in accordance with a sensitivity of the sensor based on the output of the sensor during fuel-cut operation and outside atmospheric pressure correction based on outside atmospheric pressure, and determine the presence or absence of a variation abnormality in an air-fuel ratio between cylinders by comparing the corrected value with a predetermined value.

4 Claims, 24 Drawing Sheets

(56) References Cited

FOREIGN PATENT DOCUMENTS

| | | | |
|---|---|---|---|
| JP | 2010-255479 | A | 11/2010 |
| JP | 2010-261846 | A | 11/2010 |
| JP | 2011-106309 | A | 6/2011 |
| JP | 2012-092803 | A | 5/2012 |
| JP | 2012-132392 | A | 7/2012 |
| JP | 2013-224651 | A | 10/2013 |
| WO | 2011070688 | A1 | 6/2011 |
| WO | 2011111183 | A1 | 9/2011 |

* cited by examiner

APPARATUS FOR DETECTING VARIATION ABNORMALITY IN AIR-FUEL RATIO BETWEEN CYLINDERS

CROSS-REFERENCES TO RELATED APPLICATIONS

This application claims the benefit of Japanese Patent Application No. 2013-079463, filed Apr. 5, 2013, which is hereby incorporated by reference herein in its entirety.

BACKGROUND OF THE INVENTION

Field of the Invention

The present invention relates to an apparatus for detecting a variation abnormality in an air-fuel ratio between cylinders in an internal combustion engine having a plurality of cylinders.

Description of the Related Art

Generally, in an internal combustion engine provided with an exhaust gas purification system that uses a catalyst, it is necessary to control a mixture ratio between air and fuel, that is, an air-fuel ratio, of an air-fuel mixture to be burned in the internal combustion engine in order to purify harmful components in exhaust gas using the catalyst with high efficiency. To control the air-fuel ratio, an air-fuel ratio sensor is provided in an exhaust passage of the internal combustion engine, and feedback control is performed such that the air-fuel ratio detected by the air-fuel ratio sensor follows a predetermined target air-fuel ratio.

On the other hand, in an internal combustion engine having a plurality of cylinders, that is, a so-called multicylinder internal combustion engine, air-fuel ratio control is usually performed over all the cylinders by using the same control amount, and thus an actual air-fuel ratio may vary among the cylinders even when the air-fuel ratio control is performed. In this case, a small variation can be accommodated by air-fuel ratio feedback control, and harmful components in the exhaust gas can be purified by the catalyst. Therefore, such a small variation does not influence exhaust emissions and does not matter.

However, if a fuel injection system of one or some of the cylinders or a valve system of an intake valve goes out of order, for example, the air-fuel ratio varies greatly among the cylinders. This causes a problem of deterioration of exhaust emissions. It is desirable to detect such a large air-fuel ratio variation that deteriorates exhaust emissions as an abnormality.

For example, conventionally there is a suggestion of detecting occurrence of a variation abnormality in an air-fuel ratio between cylinders, that is, an air-fuel ratio imbalance, by comparing a detected air-fuel ratio change rate based on the output of an air-fuel ratio sensor provided in the exhaust passage with a determination threshold (see, for example, International Publication No. WO2011/070688).

SUMMARY OF THE INVENTION

The same sensors or the same type of sensors each have their individual sensitivity, and the sensitivity varies even among normal air-fuel ratio sensors. Accordingly, when the same system (for example, the system disclosed in International Publication No. WO2011/070688) is installed in a plurality of internal combustion engines to detect a variation abnormality in an air-fuel ratio between cylinders, in each of the internal combustion engines, there is a possibility of erroneous detection of the abnormality.

In the case of a plurality of internal combustion engines having the same system, it is possible to configure the system such that the determination threshold is set to a value between an air-fuel ratio change rate (first change rate) detected by a normal air-fuel ratio sensor with a relatively high sensitivity in an internal combustion engine when there is no variation abnormality in an air-fuel ratio between cylinders and an air-fuel ratio change rate (second change rate) detected by a normal air-fuel ratio sensor with a relatively low sensitivity in another internal combustion engine when there is a variation abnormality in an air-fuel ratio between cylinders. However, even when the air-fuel ratio of the burned air-fuel mixture is the same, the output of the single air-fuel ratio sensor may vary due to various factors (for example, an intake air amount). Accordingly, a difference between the first change rate and the second change rate may also vary, thereby leading to the erroneous detection of a variation abnormality in an air-fuel ratio between cylinders.

In addition, a decrease in outside atmospheric pressure in uplands or the like occasionally affects the output of the air-fuel ratio sensor.

The present invention has been made in light of the above circumstances, and it is an object of the present invention to provide an apparatus that can preferably detect a variation abnormality in an air-fuel ratio between cylinders in a plurality of internal combustion engines even when the sensitivity varies among air-fuel ratio sensors in exhaust passages installed in the internal combustion engines and even when there is a change in outside atmospheric pressure.

According to one aspect of the present invention, there is provided an apparatus for detecting a variation abnormality in an air-fuel ratio between cylinders in an internal combustion engine having a plurality of cylinders. The apparatus includes: an air-fuel ratio change value calculation unit configured to calculate a value representing a change in an air-fuel ratio based on an output of an air-fuel ratio sensor that is provided in an exhaust passage in a predetermined operating state in which fuel is injected from a fuel injection valve; a sensitivity correction unit configured to perform sensitivity correction in accordance with a sensitivity of the air-fuel ratio sensor based on the output of the air-fuel ratio sensor during fuel-cut operation; an outside atmospheric pressure detection unit configured to detect outside atmospheric pressure; an outside atmospheric pressure correction unit configured to perform outside atmospheric pressure correction based on the outside atmospheric pressure detected by the outside atmospheric pressure detection unit; and a determination unit configured to determine the presence or absence of a variation abnormality in an air-fuel ratio between cylinders by comparing the value calculated by the air-fuel ratio change value calculation unit with a predetermined value, while performing the sensitivity correction by the sensitivity correction unit and the outside atmospheric pressure correction by the outside atmospheric pressure correction unit.

Preferably, the determination unit may compare the value, which is corrected through the outside atmospheric pressure correction and the sensitivity correction, calculated by the air-fuel ratio change value calculation unit with the predetermined value.

Alternatively, the determination unit may compare the value calculated by the air-fuel ratio change value calculation unit with the predetermined value which is corrected through the outside atmospheric pressure correction and the sensitivity correction.

Incidentally, the sensitivity correction unit may perform the sensitivity correction such that the smaller the sensitivity of the air-fuel ratio sensor, the larger the difference between an uncorrected value and a corrected value. Further, the outside atmospheric pressure correction unit may perform the outside atmospheric pressure correction such that the lower the outside atmospheric pressure, the larger the difference between an uncorrected value and a corrected value.

According to the present invention having the above-described configuration, a variation abnormality in an air-fuel ratio between cylinders is detected by comparing the value calculated by the air-fuel ratio change value calculation unit with the predetermined value, while performing the sensitivity correction in accordance with the sensitivity of the air-fuel ratio sensor based on the output of the air-fuel ratio sensor during fuel-cut operation and the outside atmospheric pressure correction based on the outside atmospheric pressure. Since the air-fuel ratio does not generally change during fuel-cut operation, the output of the air-fuel ratio sensor during fuel-cut operation depends on the sensitivity of the air-fuel ratio sensor. Accordingly, by performing the sensitivity correction in accordance with the sensitivity of the air-fuel ratio sensor, it is possible to substantially cancel variation in sensitivity among air-fuel ratio sensors. In addition, by performing the outside atmospheric pressure correction based on the outside atmospheric pressure, it is possible to substantially cancel the influence of the outside atmospheric pressure. Therefore, even when the sensitivity varies among air-fuel ratio sensors and even when there is a change in outside atmospheric pressure, it is possible to preferably detect a variation abnormality in an air-fuel ratio between cylinders according to the present invention.

Further features of the present invention will become apparent from the following description of exemplary embodiments (with reference to the attached drawings).

BRIEF DESCRIPTION OF THE DRAWINGS

FIG. 13A shows an uncorrected output gradient, and FIG. 13B shows a corrected output gradient;

DESCRIPTION OF THE EMBODIMENTS

Hereinafter, embodiments of the present invention will be described with reference to the attached drawings. First, a first embodiment will be described.

Figure 1:
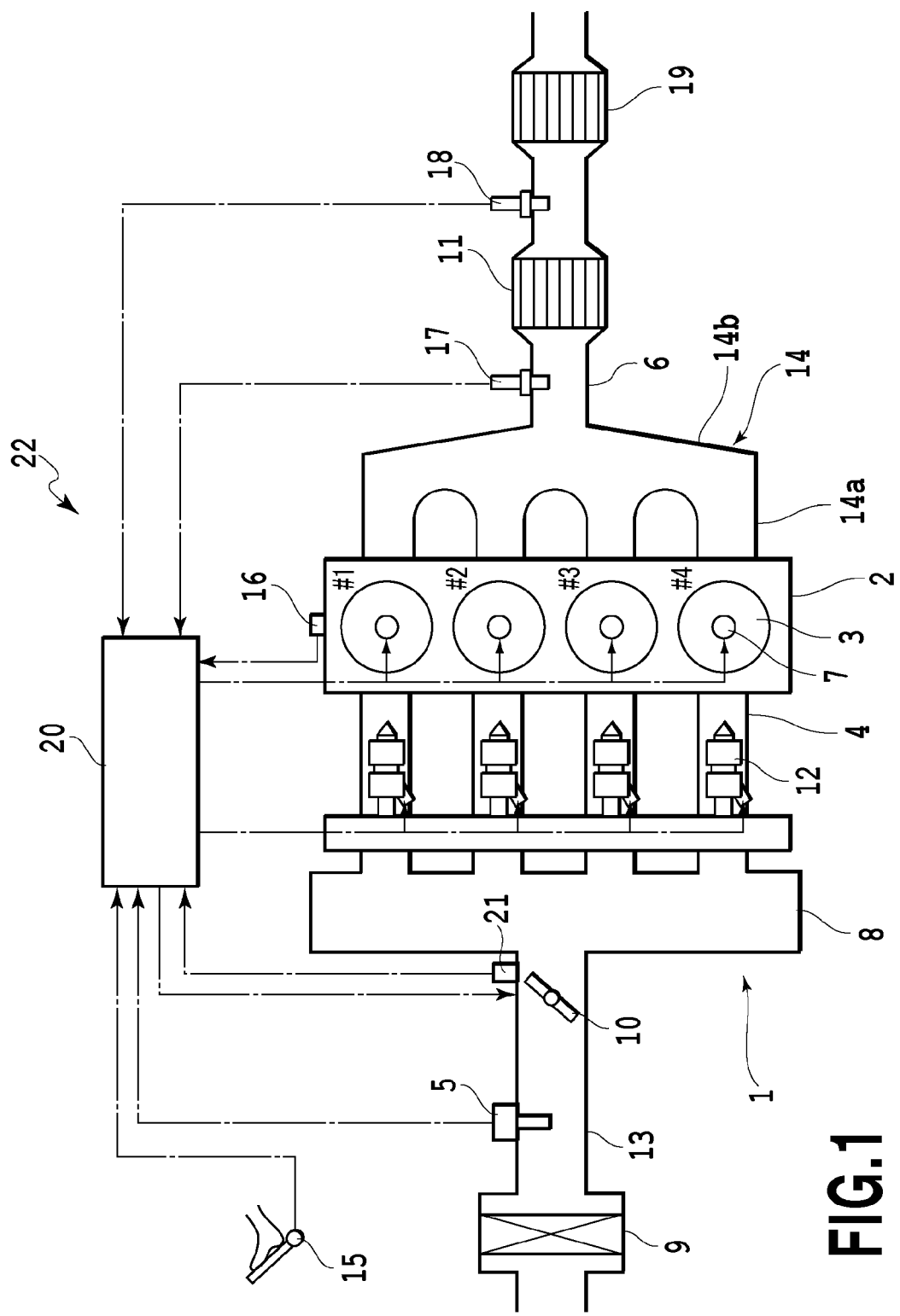
FIG. 1 is a schematic view of an internal combustion engine according to a first embodiment.

FIG. 1 is a schematic view of an internal combustion engine according to the first embodiment. As shown in FIG. 1, the internal combustion engine (engine) 1 burns a mixture of fuel and air in combustion chambers 3 formed in a cylinder block 2 to reciprocally move pistons, thus generating power. The engine 1 according to the present embodiment is mounted on an automobile, and is an internal combustion engine with a plurality of cylinders, that is, a multi-cylinder internal combustion engine, and more specifically, a serial four-cylinder spark ignition internal combustion engine. The engine 1 has cylinders #1 to #4. However, the present invention does not particularly limit the number of cylinders, use, form, and the like of the engine.

Although not shown in FIG. 1, an intake valve that opens or closes an intake port and an exhaust valve that opens or closes an exhaust port are arranged on a cylinder head of the engine 1 for each of the cylinders, and the intake valves and the exhaust valves are opened or closed by camshafts. An ignition plug 7 for igniting an air-fuel mixture in the combustion chamber 3 is attached to the top of the cylinder head for each cylinder.

The intake ports of the cylinders are connected to a surge tank 8, which is an intake collecting chamber, via branch pipes 4 of the cylinders. An intake pipe 13 is connected to the upstream side of the surge tank 8, and an air cleaner 9 is provided at the upstream end of the intake pipe 13. Then, an air flow meter 5 for detecting an intake air amount and an electronically controlled throttle valve 10 are assembled to the intake pipe 13 in order from the upstream side. The intake ports, the branch pipes 4, the surge tank 8, and the intake pipe 13 form part of an intake passage.

An injector (fuel injection valve) 12 that injects fuel into the intake passage, particularly, the intake port, is arranged for each cylinder. Fuel injected from the injector 12 is mixed with intake air to become an air-fuel mixture. The air-fuel mixture is taken into the combustion chamber 3 when the intake valve is open, compressed by the piston, and then ignited and burned by the ignition plug 7.

On the other hand, the exhaust ports of the cylinders are connected to an exhaust manifold 14. The exhaust manifold 14 is formed of branch pipes 14a of the cylinders and an exhaust collecting portion 14b, the former forming the upstream portion of the exhaust manifold 14 and the latter forming the downstream portion of the exhaust manifold 14. An exhaust pipe 6 is connected to the downstream side of the exhaust collecting portion 14b. The exhaust ports, the exhaust manifold 14, and the exhaust pipe 6 form part of an exhaust passage.

To the upstream side and downstream side of the exhaust pipe 6 are serially assembled, respectively, an upstream catalyst converter 11 and a downstream catalyst converter 19, each including catalysts for exhaust gas purification of three-way catalysts. The upstream catalyst converter 11 and the downstream catalyst converter 19 have an oxygen storage capacity ($O_2$ storage capacity). That is, the upstream catalyst converter 11 and the downstream catalyst converter 19 occlude excessive oxygen in the exhaust gas when the exhaust air-fuel ratio is larger (leaner) than a stoichiometric air-fuel ratio (a theoretical air-fuel ratio; for example, A/F=14.6) and reduce NOx. Meanwhile, the upstream catalyst converter 11 and the downstream catalyst converter 19 release occluded oxygen when the exhaust air-fuel ratio is smaller (richer) than the stoichiometric air-fuel ratio and oxidize HC and CO.

First and second air-fuel ratio sensors, that is, a catalyst upstream sensor 17 and a catalyst downstream sensor 18, are respectively provided upstream and downstream of the upstream catalyst converter 11, that is, the catalyst in the converter 11 in order to detect the air-fuel ratio of the exhaust gas. These catalyst upstream sensor 17 and catalyst downstream sensor 18 are respectively provided at positions immediately before and after the upstream catalyst converter 11 so as to detect the air-fuel ratio on the basis of the oxygen concentration of the exhaust gas. In this way, the single catalyst upstream sensor 17 is provided at an exhaust merging portion upstream of the upstream catalyst converter 11.

The above-described ignition plugs 7, throttle valve 10, injectors 12, and the like are electrically connected to an electronic control unit (ECU) 20 having functions as various control units or control devices. The ECU 20 includes a CPU (central processing unit), a storage device including a ROM and a RAM, an input/output port, and the like (all of which are not shown). In addition, as shown in FIG. 1, in addition to the above-described air flow meter 5, catalyst upstream sensor 17, and catalyst downstream sensor 18, a crank angle sensor 16 for detecting a crank angle of the engine 1, an accelerator opening sensor 15 for detecting an accelerator opening degree, an intake pressure sensor 21 for detecting a pressure in the intake passage, and other various sensors (not shown) are electrically connected to the ECU 20 via an A/D converter (not shown) or the like. The ECU 20 controls the ignition plugs 7, the throttle valve 10, the injectors 12, and the like, on the basis of outputs of various sensors (detected values), so as to obtain desired outputs to thereby control the ignition timing, the fuel injection amount, the fuel injection timing, the throttle opening degree, and the like. In this way, the ECU 20 substantially functions as an ignition (timing) control unit, a fuel injection control unit, an intake air amount control unit, and an air-fuel ratio control unit.

Incidentally, the ECU 20 functions as an air-fuel ratio change value calculation unit for calculating a value representing a change in the air-fuel ratio on the basis of the output of the catalyst upstream sensor 17 which is an air-fuel ratio sensor, a sensitivity correction unit for performing sensitivity correction in accordance with the sensitivity of the catalyst upstream sensor, an outside atmospheric pressure correction unit for performing correction based on the outside atmospheric pressure, and a determination unit for determining the presence or absence of a variation abnormality in an air-fuel ratio between cylinders by comparing the value representing a change in the air-fuel ratio with a predetermined value. Note that these units are related to each other.

The throttle valve 10 is provided with a throttle opening sensor (not shown), and signals from the throttle opening sensor are sent to the ECU 20. The ECU 20 normally feedback controls the opening degree of the throttle valve 10 (throttle opening degree) to a target throttle opening degree determined according to the accelerator opening degree.

The ECU 20 detects the amount of intake air per unit time, that is, an intake air amount, based on the signals from the air flow meter 5. Then, the ECU 20 detects an engine load (or a load factor) on the basis of at least one of the detected accelerator opening degree, the throttle opening degree, and the intake air amount.

The ECU 20 detects the crank angle and detects a rotational speed of the engine 1, based on the crank pulse signal from the crank angle sensor 16. The term "rotational speed" as used herein means the number of revolutions per unit time, in particular, revolutions per minute (rpm).

Figure 2:
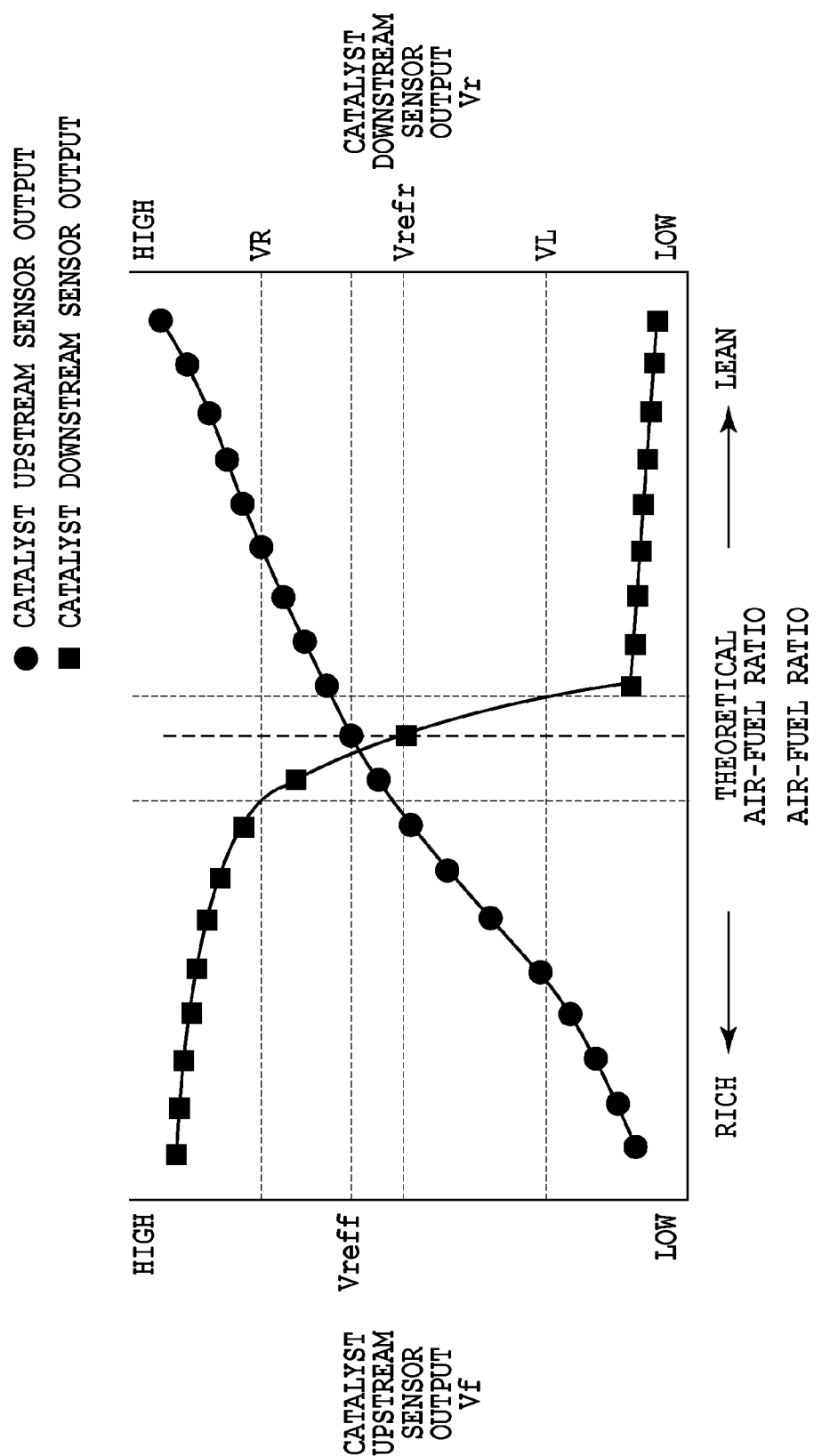
FIG. 2 is a graph showing the output characteristics of a catalyst upstream sensor and a catalyst downstream sensor.

The catalyst upstream sensor 17 as an air-fuel ratio detection unit (air-fuel ratio detector) is formed of a so-called wide range air-fuel ratio sensor and is capable of continuously detecting the air-fuel ratio over a relatively wide range. FIG. 2 shows the output characteristics of the catalyst upstream sensor 17. As shown in FIG. 2, the catalyst upstream sensor 17 outputs a voltage signal Vf having a level that is proportional to the oxygen concentration in the exhaust gas corresponding to the air-fuel ratio of a burned fuel-air mixture. When the air-fuel ratio is a theoretical air-fuel ratio (stoichiometry), the output voltage is Vreff (for example, about 3.3 V).

On the other hand, the catalyst downstream sensor 18 as a second air-fuel ratio detection unit (second air-fuel ratio detector) is formed of a so-called $O_2$ sensor, and has such a characteristic that the output value steeply varies at the stoichiometric air-fuel ratio. In other words, the catalyst downstream sensor 18 has output characteristics that an output variation is larger relative to an air-fuel ratio variation in a predetermined air-fuel ratio region, as compared to the output characteristics of the catalyst upstream sensor 17. FIG. 2 shows the output characteristics of the catalyst downstream sensor 18. As shown in FIG. 2, when the air-fuel ratio is a stoichiometric air-fuel ratio, the output voltage, that is, a stoichiometric corresponding value, is Vrefr (for example, 0.45 V). The output voltage of the catalyst downstream sensor 18 changes within a predetermined range (for example, in the range of 0 to 1 V). When the air-fuel-ratio is leaner than the stoichiometric air-fuel ratio, the output voltage of the catalyst downstream sensor is lower than the stoichiometric air-fuel ratio corresponding value Vrefr; whereas, when the air-fuel ratio is richer than the stoichiometric air-fuel ratio, the output voltage of the catalyst downstream sensor is higher than the stoichiometric air-fuel ratio corresponding value Vrefr.

The upstream catalyst converter 11 and the downstream catalyst converter 19 simultaneously purify NOx, HC, and CO, which are harmful components in exhaust gas, when the air-fuel ratio A/F of exhaust gas flowing into the respective converters is near the stoichiometric air-fuel ratio. The range (window) of air-fuel ratio, in which these three components may be purified at the same time with high efficiency, is relatively narrow.

During normal operation of the engine 1, air-fuel ratio feedback control (stoichiometric control) is performed by a section of ECU20 having a function of the air-fuel ratio control, in this case the air-fuel ratio feedback control, so that the detected air-fuel ratio of exhaust gas flowing into the upstream catalyst converter 11 is controlled to be close to the stoichiometric air-fuel ratio. The air-fuel ratio feedback control includes main air-fuel ratio feedback control in which the air-fuel ratio detected by using the catalyst upstream sensor 17 is brought to correspond to the stoichiometric air-fuel ratio that is a predetermined target air-fuel ratio and auxiliary air-fuel ratio feedback control in which the air-fuel ratio detected by using the catalyst downstream sensor 18 is brought to correspond to the stoichiometric air-fuel ratio. More specifically, in the main air-fuel ratio feedback control, a first correction coefficient is calculated so that a current detected air-fuel ratio of exhaust gas detected based on the output of the catalyst upstream sensor 17 follows a predetermined target air-fuel ratio, and then control is performed to adjust the fuel injection amount from the injectors 12 based on the first correction coefficient. Then in the auxiliary air-fuel ratio feedback control, a second correction coefficient is calculated based on the output of the catalyst downstream sensor 18, and then control is performed to modify the first correction coefficient obtained in the main air-fuel ratio feedback control on the basis of the second correction coefficient.

Incidentally, in the engine 1, fuel injection from the injectors 12 is stopped (fuel cut (F/C)) when an engine rotational speed obtained based on the output of the crank angle sensor 16 is equal to or larger than a predetermined rotational speed (fuel-cut rotational speed) and the amount of depression of an accelerator pedal obtained based on the output of the accelerator opening sensor 15 is zero, that is, the accelerator pedal is not depressed. However, when such a fuel-cut condition continues and results in decrease in the engine rotational speed to reach another predetermined rotational speed (fuel-cut recovery rotational speed), or when the accelerator pedal is depressed, the fuel injection is started again. Note that during the fuel cut, this generally happens in deceleration.

For example, it is assumed that a certain cylinder of all the cylinders (particularly one cylinder) is out of order and an air-fuel ratio variation (imbalance) occurs between the cylinders. For example, this is the case where the injector 12 of the cylinder #1 goes out of order and the fuel injection amount of the cylinder #1 relatively increases, and as a result, the air-fuel ratio of the cylinder #1 deviates toward a rich side by a large amount as compared to that of each of the other cylinders #2, #3, and #4. In this case as well, when a relatively large correction amount is applied through the above-described main air-fuel ratio feedback control, the air-fuel ratio of total gas supplied to the catalyst upstream sensor 17 may be controlled to be close to the stoichiometric air-fuel ratio. However, observing the air-fuel ratio of each cylinder, the air-fuel ratio of the cylinder #1 is much richer than the stoichiometric air-fuel ratio, whereas the air-fuel ratio of each of the cylinders #2, #3, and #4 is leaner than the stoichiometric air-fuel ratio, and thus the fact is that the overall air-fuel ratio is stoichiometric. Such a situation is apparently undesirable in terms of emissions. Accordingly, the engine 1 is provided with an apparatus 22 for detecting a variation abnormality in an air-fuel ratio between cylinders. The apparatus 22 detects an air-fuel ratio variation between cylinders, particularly, a variation of a certain level or larger, as an abnormality.

The outline of the detection of a variation abnormality in an air-fuel ratio between cylinders in the present embodiment will be described.

Figure 3:
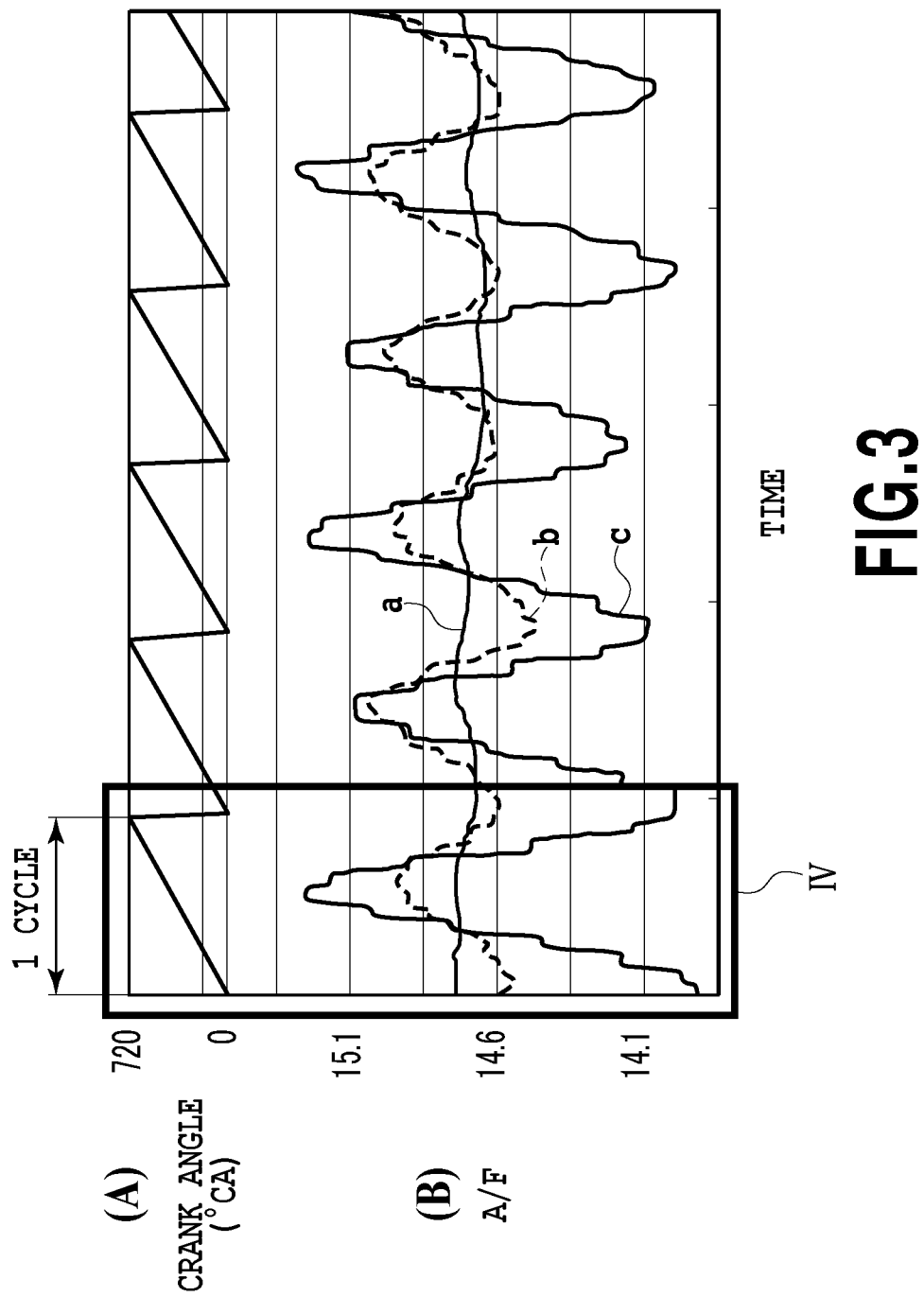
FIG. 3 is a graph showing a fluctuation in an exhaust air-fuel ratio in accordance with a degree of a variation in an air-fuel ratio between cylinders.

As shown in FIG. 3, as the air-fuel ratio variation between cylinders occurs, a fluctuation in the detected air-fuel ratio increases during one engine cycle (=720° CA). The air-fuel ratio lines a, b, and c in (B) of FIG. 3 respectively indicate air-fuel ratios A/F detected by using the catalyst upstream sensor 17 when there is no imbalance, the air-fuel ratio deviates toward a rich side by an imbalance percentage of 20% in only one cylinder, and the air-fuel ratio deviates toward a rich side by an imbalance percentage of 50% in only one cylinder. As is apparent from FIG. 3, as the degree of variation increases, the amplitude of fluctuation in the air-fuel ratio increases.

Here, the imbalance percentage (%) is a parameter representing a degree of variation in an air-fuel ratio between cylinders. That is, the imbalance percentage is a value that, when there is a deviation in a fuel injection amount in only one cylinder among all the cylinders, indicates the percentage of deviation of the fuel injection amount in the cylinder (imbalance cylinder), which includes the deviation of the fuel injection amount, from a fuel injection amount, that is, a reference injection amount, of each of the cylinders (balance cylinders) that include no deviation in the fuel injection amount. When the imbalance percentage is IB, the fuel injection amount of the imbalance cylinder is Qib, and the fuel injection amount of each balance cylinder, that is, the reference injection amount, is Qs, the imbalance percentage IB is expressed by $IB=(Qib-Qs)/Qs \times 100$. As an absolute value of the imbalance percentage IB increases, the deviation in the fuel injection amount of the imbalance cylinder from the fuel injection amount of each balance cylinder increases, and the degree of air-fuel ratio variation increases.

As can be understood from FIG. 3, as the imbalance percentage increases, that is, as the degree of air-fuel ratio variation between cylinders increases, the fluctuation in the output of the catalyst upstream sensor 17 increases. In other words, as the imbalance percentage increases, a change in the air-fuel ratio in the exhaust passage increases.

Focusing on these characteristics, detection of a variation abnormality in an air-fuel ratio between cylinders is performed. More specifically, as will be explained, the apparatus 22 for detecting a variation abnormality in an air-fuel ratio between cylinders installed in the engine 1 calculates a value ("gradient" as will be described later) representing a change (or a fluctuation) in the air-fuel ratio based on the output, that is, an output value, of the catalyst upstream sensor 17 and performs the detection of a variation abnormality in an air-fuel ratio between cylinders based on this value. Incidentally, the output value of the catalyst upstream sensor 17 corresponds to a detection value detected by using the catalyst upstream sensor 17, and the value representing a change in the air-fuel ratio corresponds to a value in accordance with a change rate of the detected air-fuel ratio.

Figure 4:
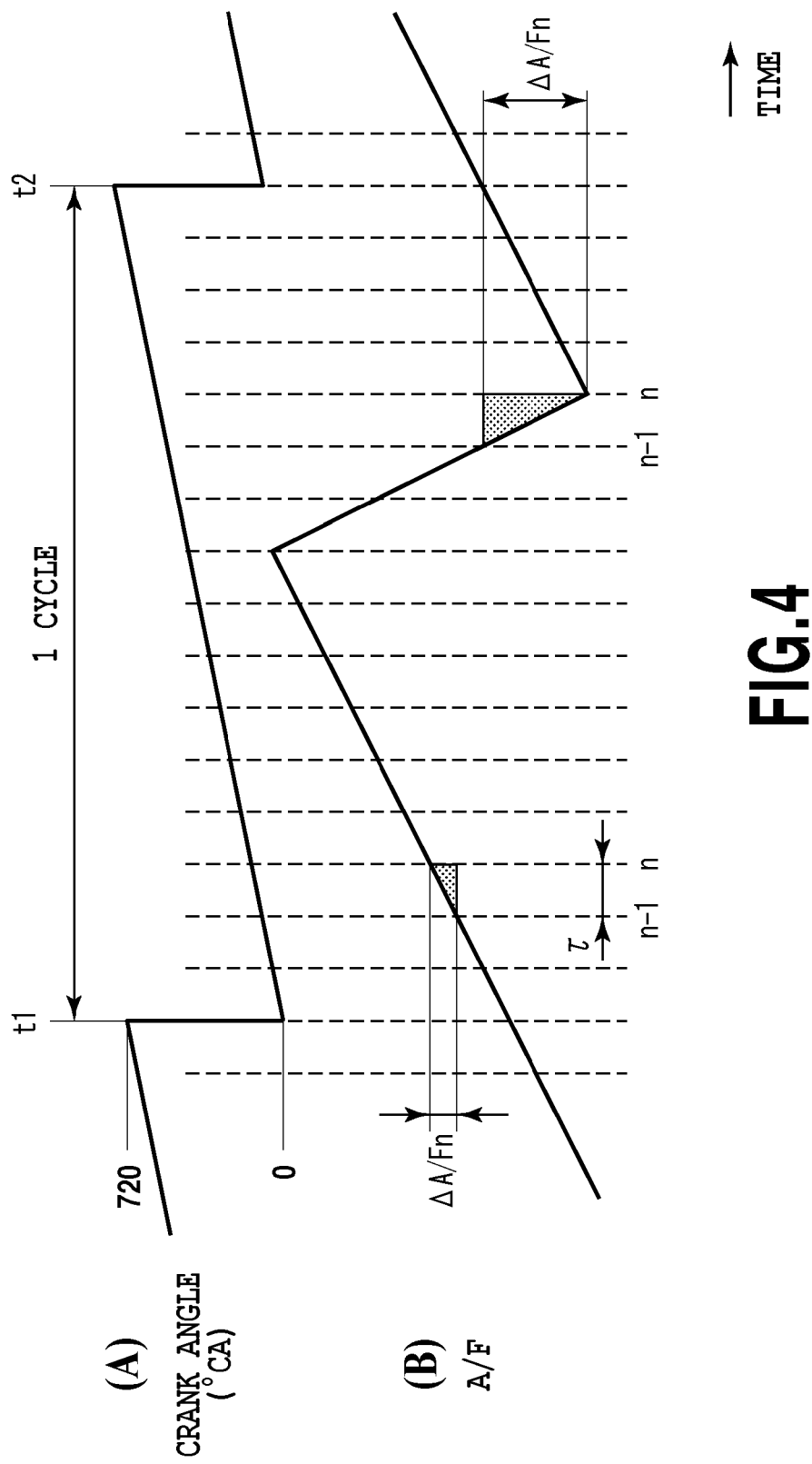
FIG. 4 is an enlarged view of portion IV of FIG. 3.

Hereinafter, calculation of derivation of the value representing a change in the air-fuel ratio in the present embodiment will be described. FIG. 4 is an enlarged schematic view of portion IV of FIG. 3. In particular, FIG. 4 simply shows a change in the output value of the catalyst upstream sensor 17 in one engine cycle. The output value of the catalyst upstream sensor is a value obtained by converting an output voltage Vf of the catalyst upstream sensor 17 to an air-fuel ratio A/F. However, it is also possible to directly use the output voltage Vf of the catalyst upstream sensor 17 as the output value.

As shown in (B) of FIG. 4, the ECU 20 operates so as to obtain an output value A/F of the catalyst upstream sensor in one engine cycle at predetermined time intervals, that is, for each predetermined period τ (unit time, for example, 4 ms). Then, the difference ΔA/Fn between the value A/Fn obtained in the current (latest) timing (second timing) and the value A/Fn−1 obtained in the previous timing (first timing) is obtained by the following equation (1). The difference ΔA/Fn can be translated into a differential value or a gradient in the current timing.

$$\Delta A/Fn = A/Fn - A/Fn-1 \quad (1)$$

In the simplest way, the difference ΔA/Fn, preferably its absolute value, represents the value representing a change in the air-fuel ratio, that is, the amount of change in the output. This is because as the degree of fluctuation increases, the slope of the air-fuel ratio line increases and the absolute value of the difference ΔA/Fn increases. Then, the difference ΔA/Fn in a predetermined timing or its absolute value can be used as the value representing a change in the air-fuel ratio.

However, to improve precision in the present embodiment, a value associated with the average of the plural differences ΔA/F is used as the value representing a change in the air-fuel ratio. In particular, in the present embodiment, as will be apparent from the following explanation, the average of the differences ΔA/F is obtained for each of the case where the difference ΔA/F is positive and the case where the difference ΔA/F is negative, and accordingly, the values representing a change in the air-fuel ratio are obtained. More specifically, since there are the case where the output value A/F of the catalyst upstream sensor 17 increases and the case where the output value A/F of the catalyst upstream sensor 17 decreases, the differences ΔA/F and their average are obtained for each case, and the absolute values of them are used as the value representing a change in the air-fuel ratio.

Incidentally, whether the difference ΔA/F is positive or negative can be ignored. For example, it is also possible to obtain the difference ΔA/F regardless of whether it is positive or negative, and use the absolute average of the differences ΔA/F as the value representing a change in the air-fuel ratio.

Figure 5:
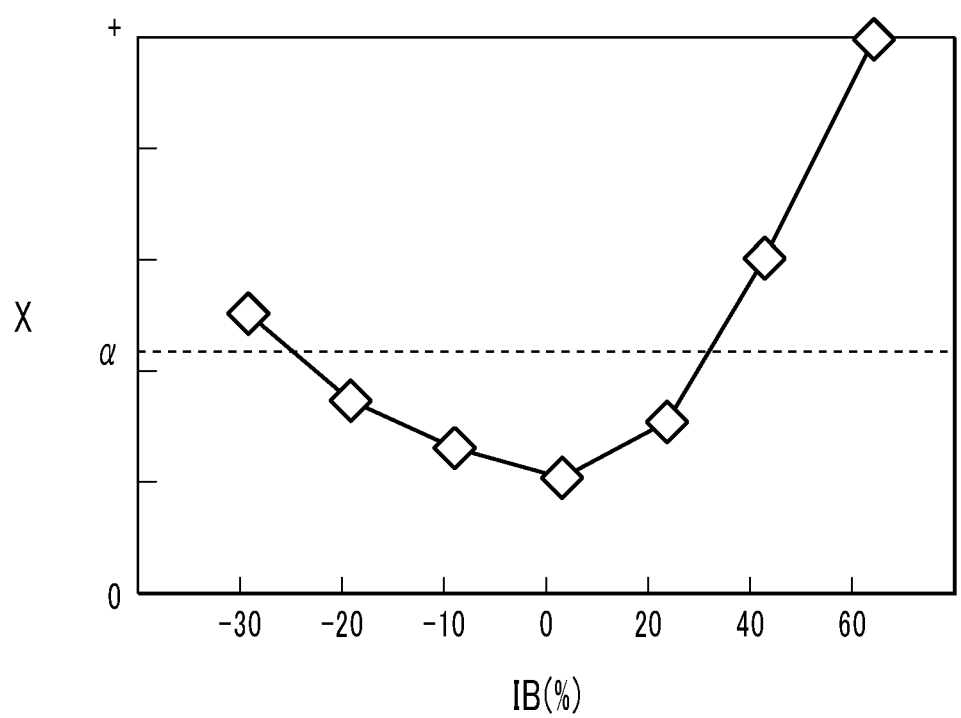
FIG. 5 is a graph showing the relationship between an imbalance percentage and a value representing a change in the air-fuel ratio.

FIG. 5 shows the relationship, as an example, between an imbalance percentage IB (%) and a value X representing a change in the air-fuel ratio. As shown in FIG. 5, there is a strong correlation between the imbalance percentage IB and the value X, and as the absolute value of the imbalance percentage IB increases, the absolute value of the value X tends to increase.

Therefore, it is possible to detect a variation abnormality in an air-fuel ratio between cylinders based on the value X representing a change in the air-fuel ratio. In other words, when the absolute value of the value X is equal to or larger than a predetermined determination threshold, it is determined that there is a variation abnormality in an air-fuel ratio between cylinders, whereas when the absolute value of the value X is smaller than a predetermined determination threshold, it is determined that there is no variation abnormality in an air-fuel ratio between cylinders, that is, the air-fuel ratio between cylinders is normal.

Here, even when the catalyst upstream sensor 17 that is an air-fuel ratio sensor operates normally, sensitivity varies between individual sensors, and thus it is desirable to detect a variation abnormality in an air-fuel ratio between cylinders in consideration of the sensitivity. Here, FIG. 6 is a cross-sectional schematic view of a sensor element 30 of the catalyst upstream sensor 17 and FIG. 7 is an enlarged view of a part of the sensor element 30 of FIG. 6.

Figure 6:
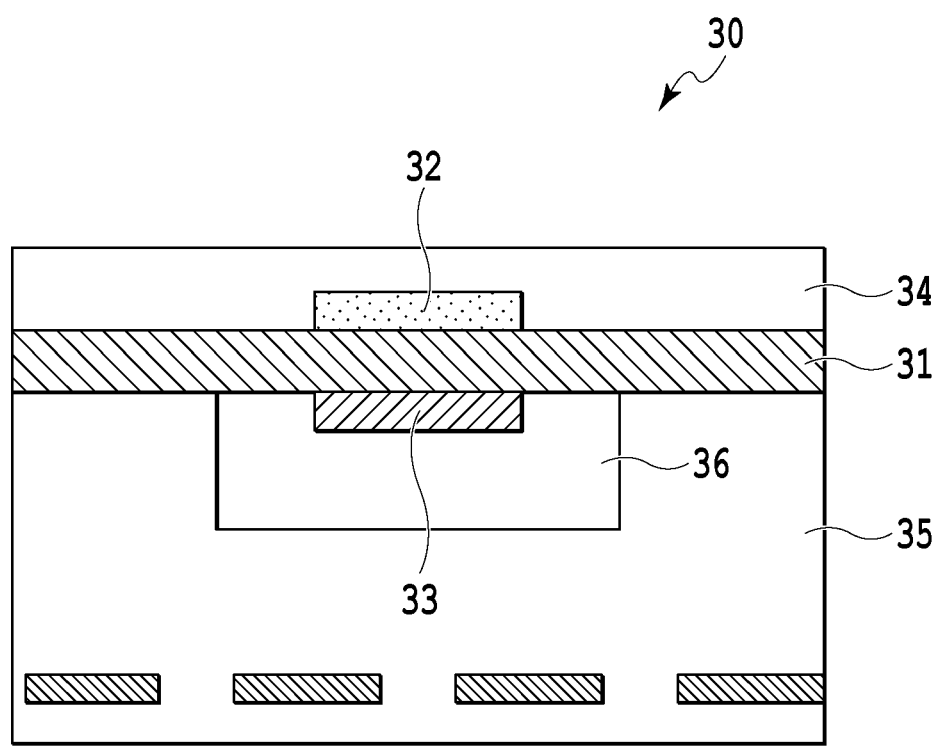
FIG. 6 is a cross-sectional schematic view of a sensor element of the catalyst upstream sensor.
Figure 7:
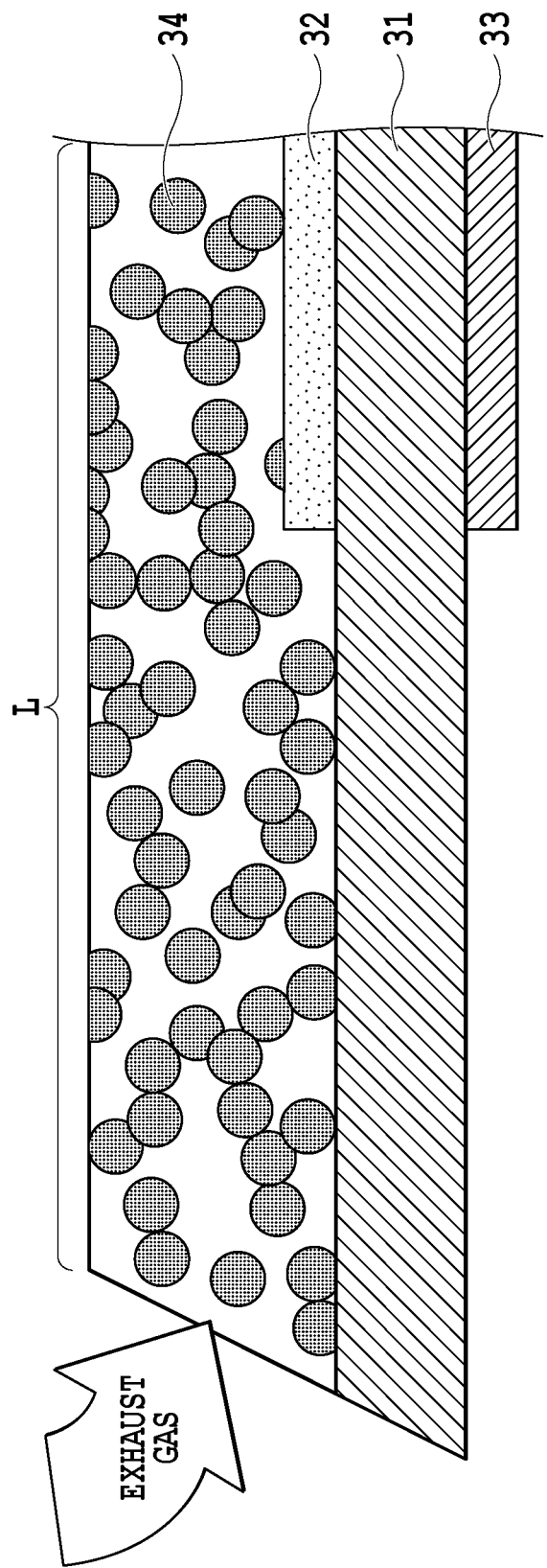
FIG. 7 is an enlarged schematic view of a part of FIG. 6.

The catalyst upstream sensor 17 has the sensor element 30 having a cross-sectional structure shown in FIG. 6 and a cover (not shown) for protecting the sensor element 30. The catalyst upstream sensor 17 is assembled into the exhaust passage of the engine 1 such that the sensor element 30 covered with the cover is exposed to an exhaust gas, and the cover is provided with a plurality of ventilating openings so that the exhaust gas flowing through the exhaust passage reaches the sensor element 30.

The sensor element 30 of the catalyst upstream sensor 17 includes a solid electrolyte 31 and a pair of electrodes, an exhaust-side electrode 32 and an atmosphere-side electrode 33 between which the solid electrolyte 31 is sandwiched. On a surface of the exhaust-side electrode 32, a diffusion layer 34 is formed to cover the exhaust-side electrode 32. The diffusion layer 34 is made of porous material and has functions of homogenizing the exhaust flowing through the exhaust passage and adequately controlling the rate of the flow.

On the other hand, an insulating substrate 35 is disposed at a side where the atmosphere-side electrode 33 of the solid electrolyte 31 is placed. In the insulating substrate 35 a recessed portion is formed, and an atmospheric chamber 36 is defined by the recessed portion and the solid electrolyte 31. The atmosphere-side electrode 33 is disposed on a part of the solid electrolyte 31, which defines the atmospheric chamber 36. Atmosphere that serves as a reference gas is introduced into the atmospheric chamber 36 from the outside, and a surface of the atmosphere-side electrode 33 is in contact with the atmosphere that is introduced into the atmospheric chamber 36.

The response characteristic (sensitivity) of the sensor element 30 itself greatly depends on the resistance of the diffusion layer 34 and the length of the diffusion layer 34. More specifically, as the resistance of the diffusion layer 34 becomes lower (that is, the larger the pore rate) and the length L of the diffusion layer 34 becomes shorter (see FIG. 7), the response characteristic tends to increase. Therefore, the sensitivity varies among the plurality of air-fuel ratio sensors depending on the pore rate or the length L of the diffusion layer 34, and the variations in the sensitivity lead to variations in the outputs of the sensors.

Figure 8:
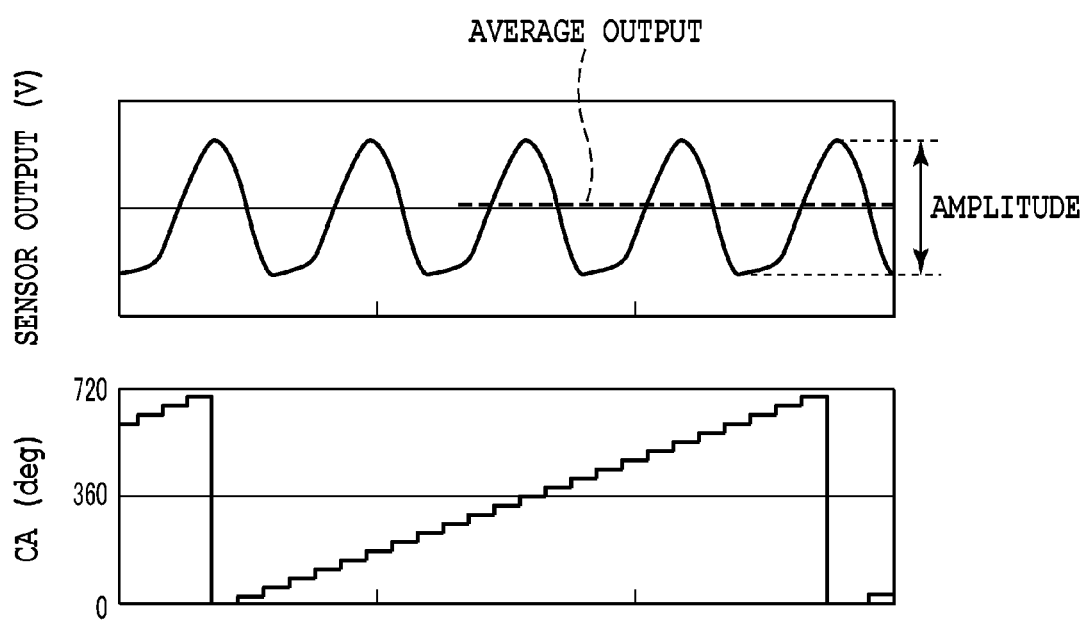
FIG. 8 is a graph showing an instance of a change in the output of the catalyst upstream sensor during fuel-cut operation.

Here, FIG. 8 shows, as an example, a change in the output of the catalyst upstream sensor 17 during fuel-cut operation. During the fuel-cut operation, the air-fuel ratio is generally constant, but the output of the catalyst upstream sensor 17 fluctuates due to the influence of pressure pulsation by the exhaust gas intermittently discharged from the cylinders.

Therefore, the change in the output of the sensor is not caused by the change in the air-fuel ratio, but by the diffusion of the exhaust gas (generally air) in the diffusion layer 34 of the sensor element 30, and depends on the sensitivity of the catalyst upstream sensor 17. The present invention has focused on this point.

Figure 9:
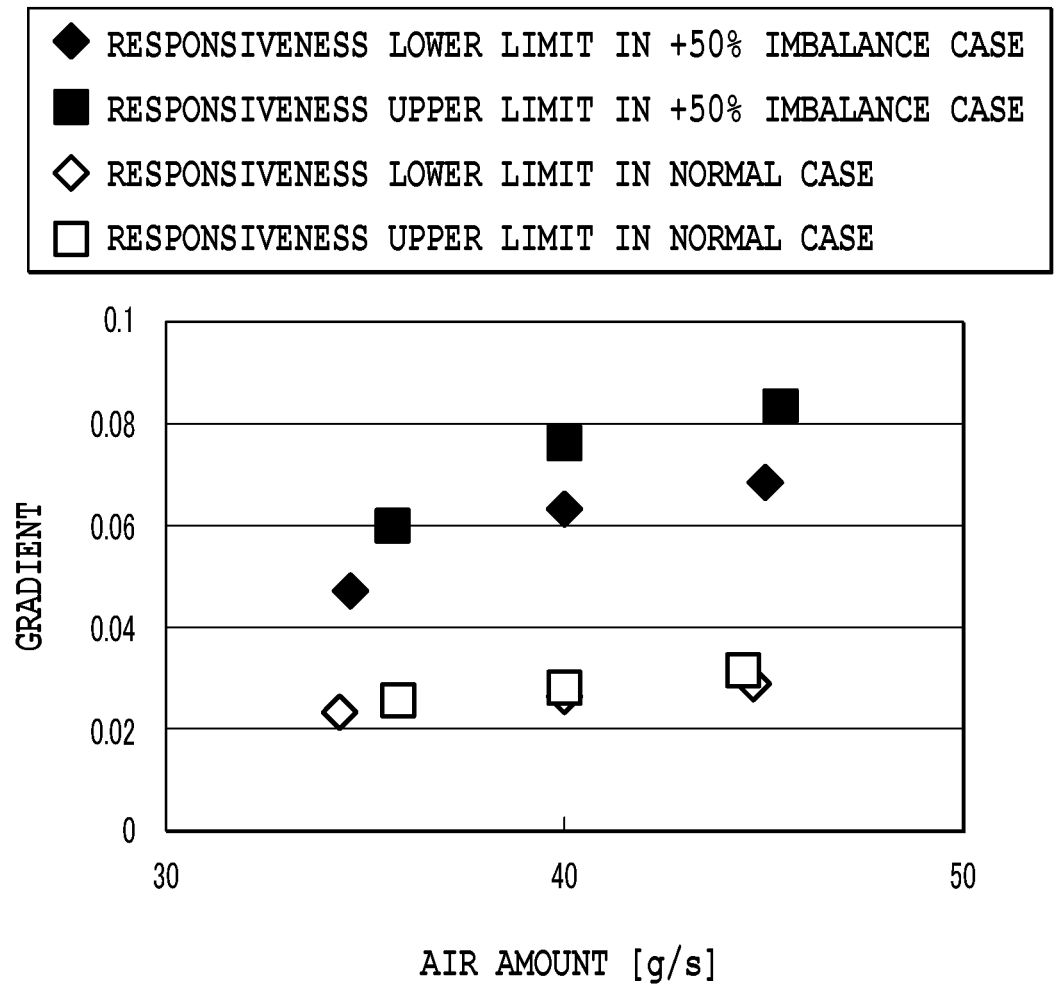
FIG. 9 is a graph of plots of a gradient of the outputs of two respective normal air-fuel ratio sensors, with respect to an intake air amount.

FIG. 9 is a graph of plots of a gradient of the outputs of two normal air-fuel ratio sensors (equivalent to the above-described difference ΔA/F) with respect to an intake air amount. The two normal air-fuel ratio sensors are selected from a plurality of normal air-fuel ratio sensors. One is a sensor with the highest sensitivity among them and the other is a sensor with the lowest sensitivity among them. In FIG. 9, the plots associated with the sensor with the highest sensitivity are shown as "responsiveness upper limit", whereas the plots associated with the sensor with the lowest sensitivity are shown as "responsiveness lower limit". FIG. 9 also shows the plots in a case where there is no variation abnormality in an air-fuel ratio between cylinders as "in normal case", and the plots in a case where the fuel injection amount of one imbalance cylinder is larger by 50% than the fuel injection amount of another normal cylinder at the time when there is an imbalance (an imbalance percentage of 50%) as "in +50% imbalance case". Note that these terms are used similarly in figures other than FIG. 9.

As can be understood from FIG. 9, the higher the responsiveness, or the sensitivity, of the air-fuel ratio sensor, the larger the gradient of the output of the air-fuel ratio sensor. Further, the larger the variation degree of an air-fuel ratio between cylinders, the larger the gradient of the output of the air-fuel ratio sensor. The gradient of the output of the air-fuel ratio sensor varies depending on the intake air amount. This is because, as described above, the intake air amount, that is, the intensity of the exhaust gas, affects the movement of the exhaust gas in the diffusion layer of the sensor element of the air-fuel ratio sensor.

On the basis of data such as the data shown in FIG. 9, a value between the gradient of the output of a sensor with a high sensitivity in a normal case and the gradient of the output of a sensor with a low sensitivity in an imbalance case is obtained, and the value thus obtained or a value equivalent thereto is used as a determination threshold for determining a variation abnormality in an air-fuel ratio between cylinders. This makes it possible to determine a variation abnormality in an air-fuel ratio between cylinders. However, even with the same air-fuel ratio, the output of the single air-fuel ratio sensor can vary due to various factors (such as the intake air amount), and accordingly the difference between gradients of the outputs may also vary. Accordingly, in view of the fact that the difference between the gradient of the output of a sensor with a high sensitivity in the normal case and the gradient of the output of a sensor with a low sensitivity in the imbalance case when there is an imbalance is not always large, applying such a determination threshold uniformly to all of the engines may result in erroneous detection of a variation abnormality in an air-fuel ratio between cylinders.

Figure 10:
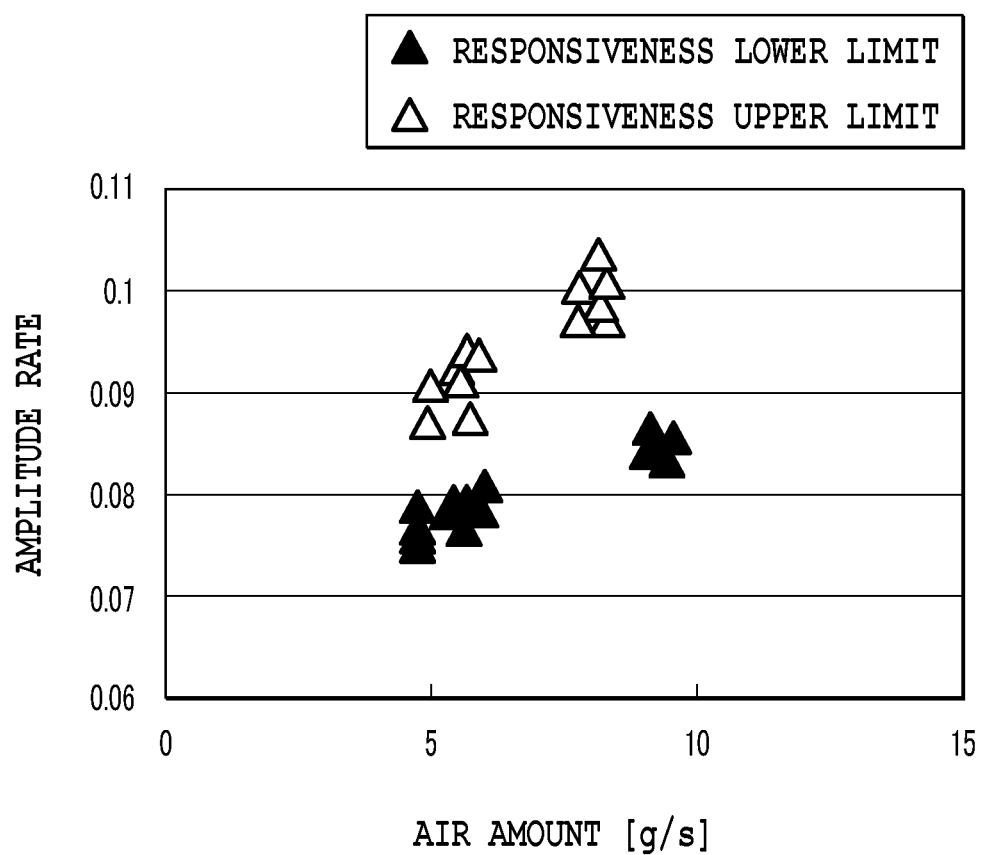
FIG. 10 is a graph showing the relationship between an intake air amount during fuel-cut operation and an amplitude rate during fuel-cut operation.

FIG. 10 is a graph for illustrating the relationship between an intake air amount during fuel-cut operation and an amplitude rate during fuel-cut operation. In FIG. 10, the horizontal axis is an intake air amount and the vertical axis is an amplitude rate during fuel-cut operation. The term "amplitude rate" as used herein means a ratio of the amplitude of the sensor output of the air-fuel ratio sensor in a predetermined period to an output average value. Incidentally, the amplitude and the output average value (average output) are shown in FIG. 8. During the fuel-cut operation of the engine, the oxygen concentration of the exhaust gas is constant in accordance with that of the atmosphere. Accordingly, even when the variation degree in an air-fuel ratio between cylinders is large, the sensor output of the air-fuel ratio sensor is not affected by the variation degree. Accordingly, the change in the output, that is, the amplitude rate, during the fuel-cut operation is considered to be caused by the sensitivity of the air-fuel ratio sensor. In other words, it is considered that the responsiveness of the air-fuel ratio sensor during the cycle, from which the influence of variation in an air-fuel ration between cylinders is excluded, appears in the amplitude rate during the fuel-cut operation, which indicates the amount of change in the sensor output during fuel-cut operation. More specifically, as shown in FIG. 10, the higher the responsiveness, or the sensitivity, of the air-fuel ratio sensor, the larger the amplitude rate during fuel-cut operation, whereas the lower the sensitivity of the air-fuel ratio sensor, the smaller the amplitude rate during fuel-cut operation.

Figure 11:
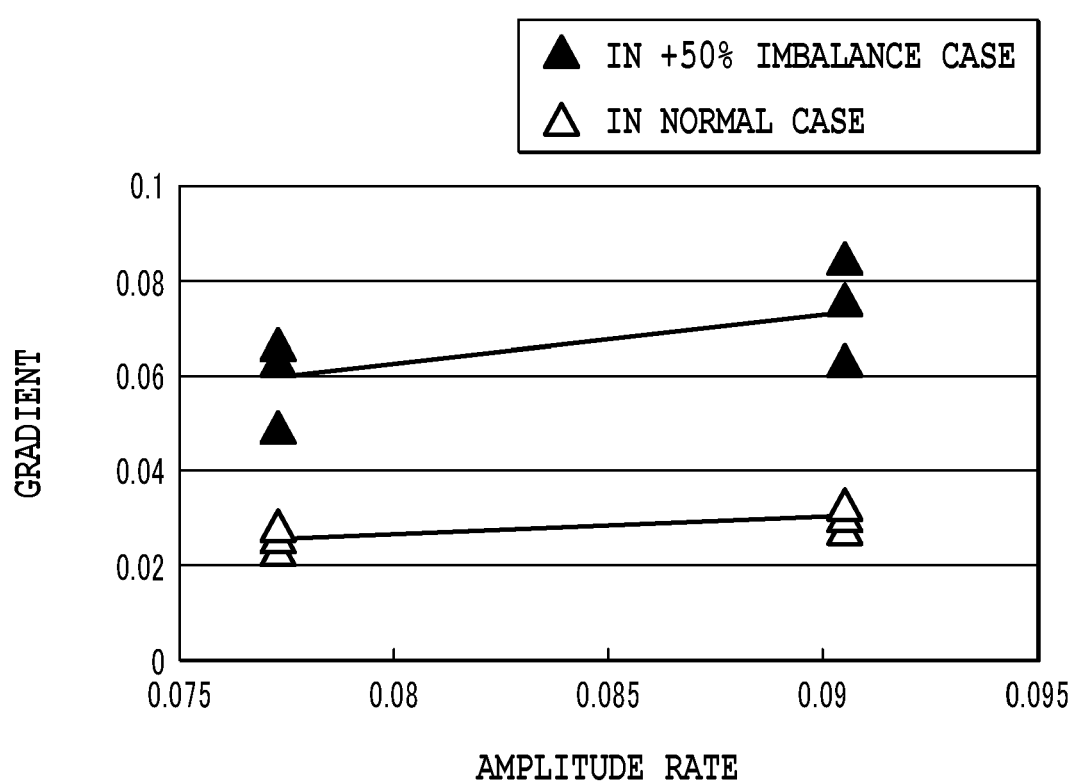
FIG. 11 is a graph showing the relationship between an amplitude rate during fuel-cut operation and a gradient of the output of the air-fuel ratio sensor during fuel injection operation.

As can be understood from FIG. 9 and FIG. 10, by focusing on the air amount in FIG. 9 and FIG. 10, it can be observed that there is a correlation between the gradient of the output of the air-fuel ratio sensor and the amplitude rate during fuel-cut operation. FIG. 11 shows examples, in a certain air amount, of the relationship between the amplitude rate during fuel-cut operation and the gradient of the output of the air-fuel ratio sensor (equivalent to the above-described difference ΔA/F) at the time of fuel injection (during non-fuel-cut operation). The relationship in FIG. 11 between the amplitude rate and the gradient of the output of the air-fuel ratio sensor is obtained through an experiment using a plurality of air-fuel ratio sensors having different sensitivities. In FIG. 11, the horizontal axis is an amplitude rate during fuel-cut operation and the vertical axis is a gradient. As shown in FIG. 11, the gradient and the amplitude rate during fuel-cut operation correlate with each other. Here, on the basis of the correlation, correction for removing or suppressing the influence of variation in the sensitivities of the air-fuel ratio sensors is performed on the gradient, that is, a value representing a change in the air-fuel ratio.

Figure 12:
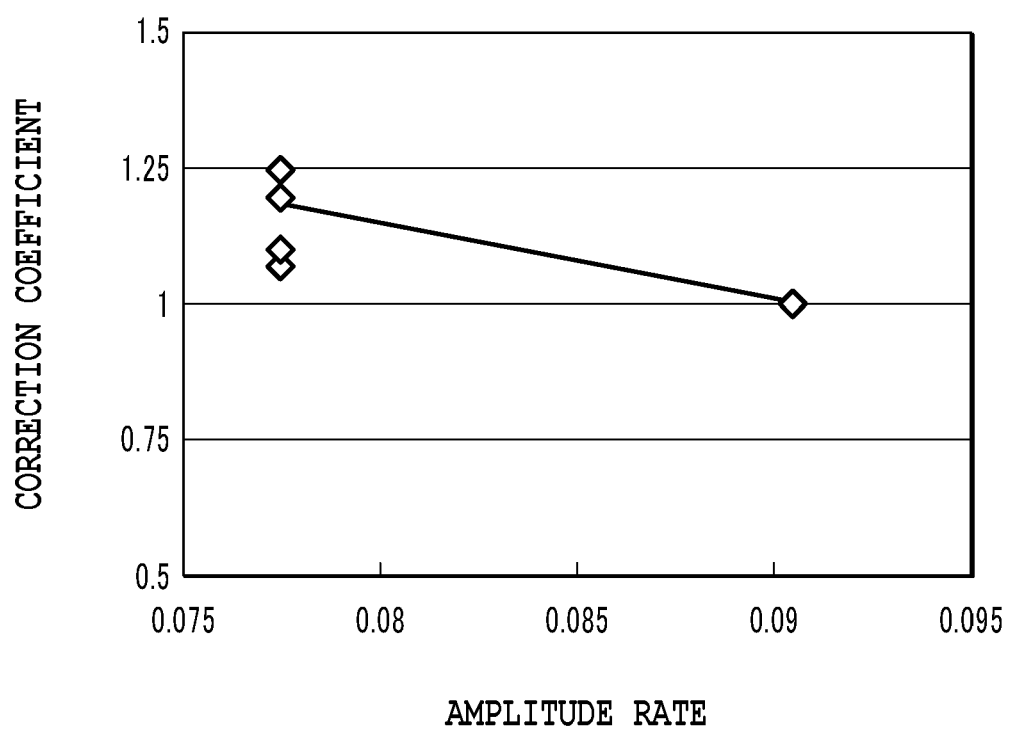
FIG. 12 is a graph showing the relationship between an amplitude rate during fuel-cut operation and a correction coefficient for the gradient of the sensor output of the air-fuel ratio sensor.

FIG. 12 shows the relationship between an amplitude rate during fuel-cut operation and a correction coefficient for the gradient of the sensor output of the air-fuel ratio sensor in a certain air amount. Here, the relationship between the amplitude rate during fuel-cut operation and the correction coefficient for the gradient of the sensor output of the air-fuel ratio sensor is linear, but the present invention is not limited to this configuration. The relationship between the amplitude rate during fuel-cut operation and the correction coefficient as shown in FIG. 12 can be obtained based on the correlation between the amplitude rate during normal fuel-cut operation and the gradient of the sensor output of the air-fuel ratio sensor at the time of fuel injection (during non-fuel-cut operation), as shown in FIG. 11. Incidentally, the correction coefficient of FIG. 12 is determined so as to convert from the output of the air-fuel ratio sensor with a relatively low sensitivity to the output of the air-fuel ratio sensor with a relatively high sensitivity, and is determined by using the sensor output of the air-fuel ratio sensor with presumably the highest sensitivity among the normal air-fuel ratio sensors, as a reference. In FIG. 12, therefore, the correction coefficient with respect to the amplitude rate based on the output of the air-fuel ratio sensor with presumably the highest sensitivity is set to "1". The relationship between the obtained amplitude rate and the correction coefficient is prepared beforehand as an arithmetic expression or data, stored in the storage device of the ECU 20, and used in a computation as will be described later.

Figure 13A:
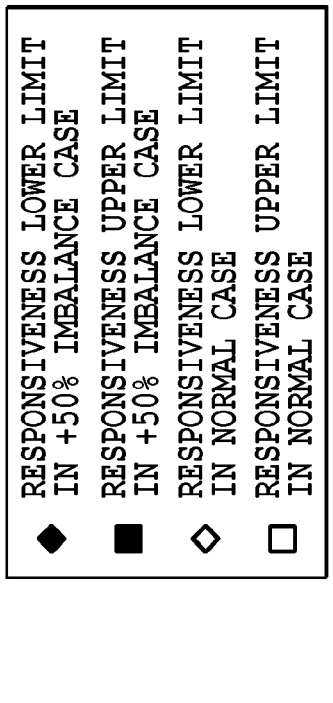
FIG. 13A and FIG. 13B are graphs illustrating a change in the output gradient of the air-fuel ratio sensor during fuel injection operation with respect to an intake air flow.
Figure 13A:
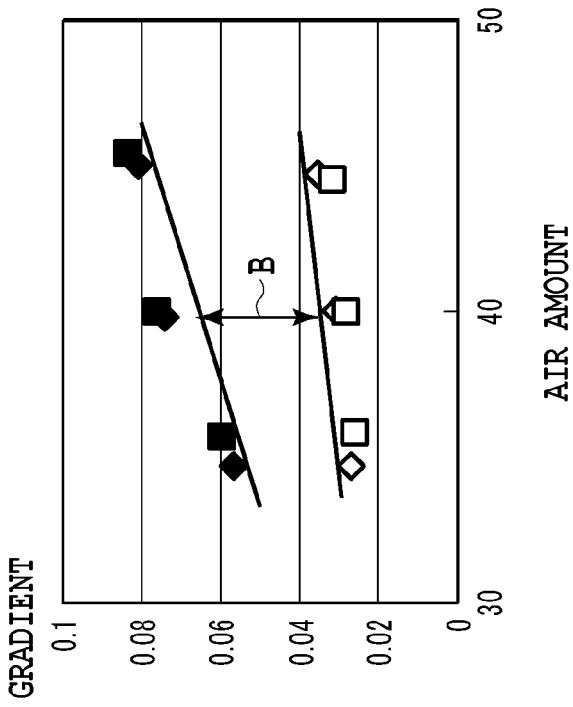
Figure 13B:
Figure 13B:
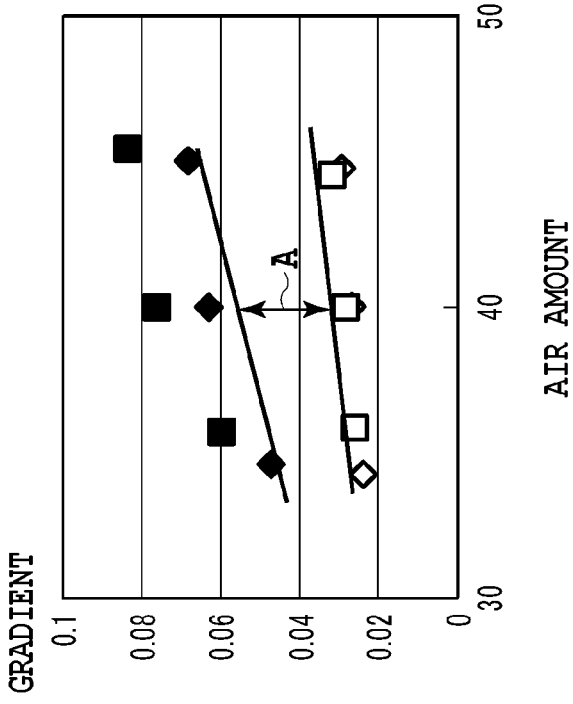

FIG. 13A and FIG. 13B are graphs for illustrating a change in the output slope at the time of fuel injection with respect to the intake air amount. FIG. 13A corresponds to FIG. 9 and shows an uncorrected output gradient, and FIG. 13B shows an output gradient corrected by using the obtained correction coefficient. As can be understood from FIG. 13B, the output gradient is corrected such that the lower the sensitivity of the air-fuel ratio sensor, the larger the correction amount of the output gradient (such that the difference between the uncorrected output gradient and the corrected output gradient is larger). As a result of the correction thus made in accordance with the amplitude rate during fuel-cut operation, the difference between the gradient of the output of the sensor with a high sensitivity in normal case and the gradient of the output of the sensor with a low sensitivity in imbalance case increases from difference A of FIG. 13A to difference B of FIG. 13B. Accordingly, whatever engine is used, or even when the air-fuel ratio sensors having different sensitivities are used, it is possible to detect (determine) a variation abnormality in an air-fuel ratio between cylinders in a more accurate manner through the computation processing as will be specifically described below.

Figure 14:
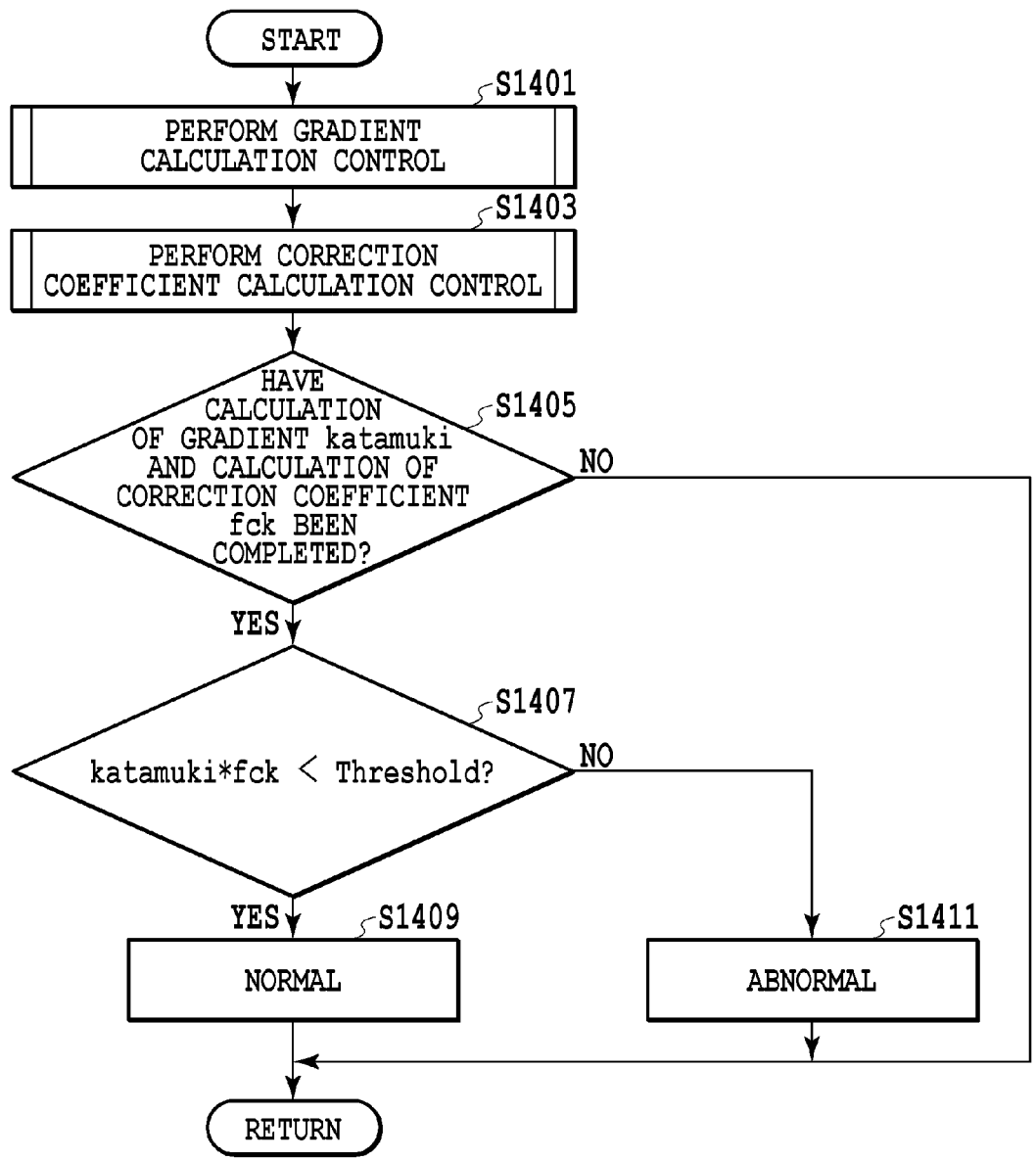
FIG. 14 is a flow chart showing a control routine in the first embodiment.

FIG. 14 is a flow chart for illustrating a routine of control executed by the ECU 20 in the first embodiment. The routine of FIG. 14 is repeatedly executed at predetermined time intervals (for example, about 1 ms to ms). In the routine of FIG. 14, first, gradient calculation control (calculation control of a value representing a change in the air-fuel ratio) is performed (step S1401). The gradient calculation control is control for calculating an output gradient "katamuki" which corresponds to an absolute value of the above-described ΔA/F. The routine of the gradient calculation control will be described later in detail.

Next, correction coefficient calculation control is performed (step S1403). The correction coefficient calculation control is control for obtaining an amplitude rate during fuel-cut operation and for calculating a correction coefficient (sensitivity correction coefficient) "fck" based on the obtained amplitude rate. The routine of the correction coefficient calculation control will be described later in detail.

Then, it is determined whether or not the calculation of the output gradient "katamuki" has been completed and the calculation of the correction coefficient "fck" has been completed (step S1405). In a case where it is determined that at least one of the calculation of the output gradient "katamuki" and the calculation of the correction coefficient "fck" has not been completed, the current process is terminated.

On the other hand, in a case where it is determined that the calculation of the output gradient "katamuki" and the calculation of the correction coefficient "fck" have been completed in S1405, it is then determined whether or not a corrected value (katamuki×fck) of the output gradient "katamuki", which is obtained by correction using the correction coefficient "fck", is smaller than a determination threshold "Threshold" (step S1407). The determination threshold "Threshold" is, for example, a value appropriately set in advance in consideration of the gradient of the output of the air-fuel ratio sensor with a high responsiveness, or sensitivity, in normal case as already described with reference to FIG. 9, FIG. 13A, and FIG. 13B, and in this control, a value stored in advance in the storage device of the ECU 20 is used. The determination threshold "Threshold" may correspond to a value α of FIG. 5.

In a case where it is determined that the corrected output gradient "katamuki×fck" is smaller than the determination threshold "Threshold", it is determined that the variation in an air-fuel ratio between cylinders is normal, that is, there is no variation abnormality in an air-fuel ratio between cylinders (the variation degree in an air-fuel ratio between cylinders is not equal to or larger than a predetermined level) (step S1409). On the other hand, in a case where it is not determined that the corrected output gradicent "katamuki×fck" is smaller than the determination threshold "Threshold", it is determined that the variation in an air-fuel ratio between cylinders is abnormal, that is, there is a variation abnormality in an air-fuel ratio between cylinders (step S1411). The process is terminated after the determination S1409 or S1411.

Figure 15:
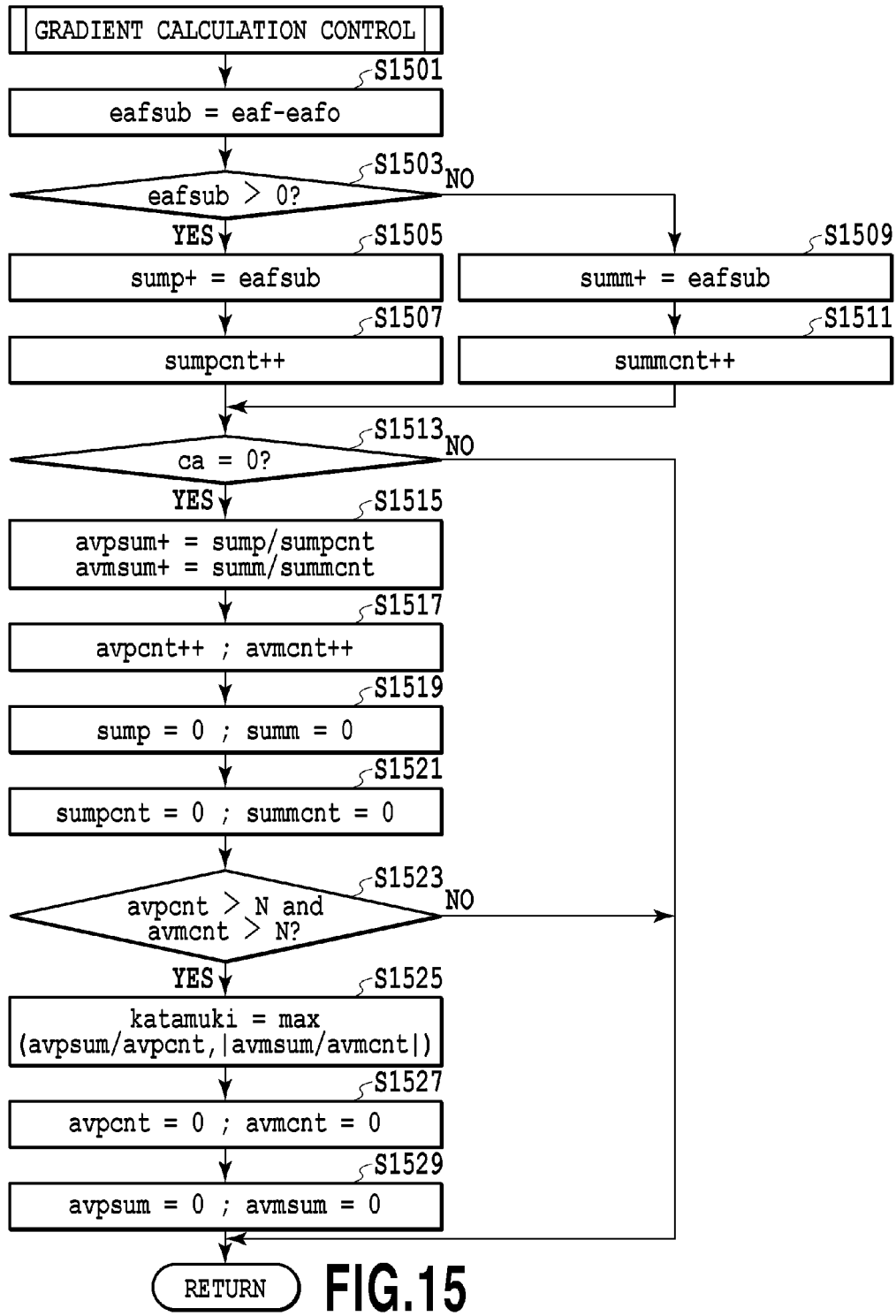
FIG. 15 is a flow chart showing a control routine in the first embodiment and shows a routine of gradient calculation control.

Then, the routine of the gradient calculation control, which corresponds to the process in S1401, will be described with reference to FIG. 15. Note that FIG. 15 is a flow chart for illustrating a control routine executed by the ECU 20 in the first embodiment. After the gradient calculation control begins, first, the computation of a difference between an air-flow ratio "eafo" in the previous execution of the routine and a current air-flow ratio "eaf", that is, the computation of the above-mentioned equation (1) is performed (step S1501). When an output gradient "eafsub" is calculated, it is then determined whether or not the output gradient "eafsub" is larger than zero (step S1503).

In a case where it is determined that the output gradient "eafsub" is larger than zero in S1503, the calculated output gradient "eafsub" is accumulated into a positive gradient accumulated value "sump" (step S1505). Then, a positive gradient accumulated count "sumpcnt" is incremented by one (step S1507). On the other hand, in a case where it is not determined that the output gradient "eafsub" is larger than zero (negative determination in S1503), the calculated output gradient "eafsub" is accumulated into a negative slope accumulated value "summ" (step S1509). Then, the negative gradient accumulated count "summcnt" is incremented (step S1511). Incidentally, the accumulated count "sumpcnt" and the accumulated count "summcnt" are value counted by counters which are set to zero in an initial state and count the number of accumulations of the output gradient "eafsub" by adding one in each accumulation process in S1505 or S1509.

After the process in S1507 or S1511, it is then determined whether or not the crank angle CA is zero (step S1513). The crank angle CA is detected based on the output of the crank angle sensor 16. In a case where it is not determined that the crank angle CA is zero, it is determined that the current timing is not the timing at which the output gradient should be calculated. Accordingly, the current process is temporarily terminated.

On the other hand, in a case where it is determined that the crank angle CA is zero in S1513, it is determined that the current timing is the timing at which the output gradient should be calculated. In this case, the process proceeds to S1515, and an average "sump/sumpcnt" of the positive gradient accumulated value "sump" is accumulated into a positive gradient average accumulated value "avpsum", whereas an average "summ/summcnt" of a negative gradient accumulated value "summ" is accumulated into a negative gradient average accumulated value "avmsum" (step S1515).

Incidentally, through the determination process in S1513, during a cycle from when the crank angle CA is zero to when the crank angle CA becomes zero again, the output gradients are accumulated and the average of the gradient accumulated value is calculated for each cycle.

Then, the positive gradient average accumulated count "avpcnt" and the negative gradient average accumulated count "avmcnt" are individually incremented (step S1517). The accumulated count "avpcnt" and the accumulated count "avmcnt" are values counted by counters which are set to zero in an initial state and count the numbers of accumulations of the average accumulated values "avpsum" and "avmsum" by respectively adding one in each accumulation process in S1515.

Next, the positive gradient accumulated value "sump" and the negative gradient accumulated value "summ" are initialized and set to zero (step S1519). Then, the positive gradient accumulated count "sumpcnt" and the negative gradient accumulated count "summcnt" are initialized and set to zero (step S1521).

Then, it is determined whether or not the positive gradient average accumulated count "avpcnt" and the negative gradient average accumulated count "avmcnt" are both larger than a predetermined number N (step S1523). In a case where it is not determined that the accumulated count "avpcnt" and the accumulated count "avmcnt" are both larger than the predetermined number, the current process is temporarily terminated.

On the other hand, in a case where it is determined that the accumulated count "avpcnt" and the accumulated count "avmcnt" are both larger than the predetermined number N in S1523, the output gradient "katamuki" is then calculated (step S1525). More specifically, the absolute value of the average "avpsum/avpcnt" obtained by dividing the positive gradient average accumulated value "avpsum" by the accumulated count "avpcnt" and the absolute value of the average "avmsum/avmcnt" obtained by dividing the negative gradient average accumulated value "avmsum" by the accumulated count "avmcnt" are calculated, and a larger value of them is set as the output gradient "katamuki".

Then, the accumulated count "avpcnt" and the accumulated count "avmcnt" are initialized and set to zero (step S1527). Further, the positive gradient average accumulated value "avpsum" and the negative gradient average accumulated value "avmsum" are initialized and set to zero (step S1529). Finally, the gradient calculation control is completed.

Incidentally, such gradient calculation is preferably performed in a predetermined operating state. More specifically, the gradient calculation is preferably performed based on the output of the catalyst upstream sensor 17 that is the air-fuel ratio sensor while the above-described air-fuel ratio feedback control is performed so that the air-fuel ratio follows a target air-fuel ratio, preferably a stoichiometric air-fuel ratio. In other words, as a precondition for the execution of the gradient calculation control, it is possible to specify that the air-fuel ratio feedback control is being performed or the operating state is a state in which the air-fuel ratio feedback control may be performed. Note that as the precondition for performing the gradient calculation control, the present invention allows specifying an additional requirement or an alternative requirement.

Figure 16:
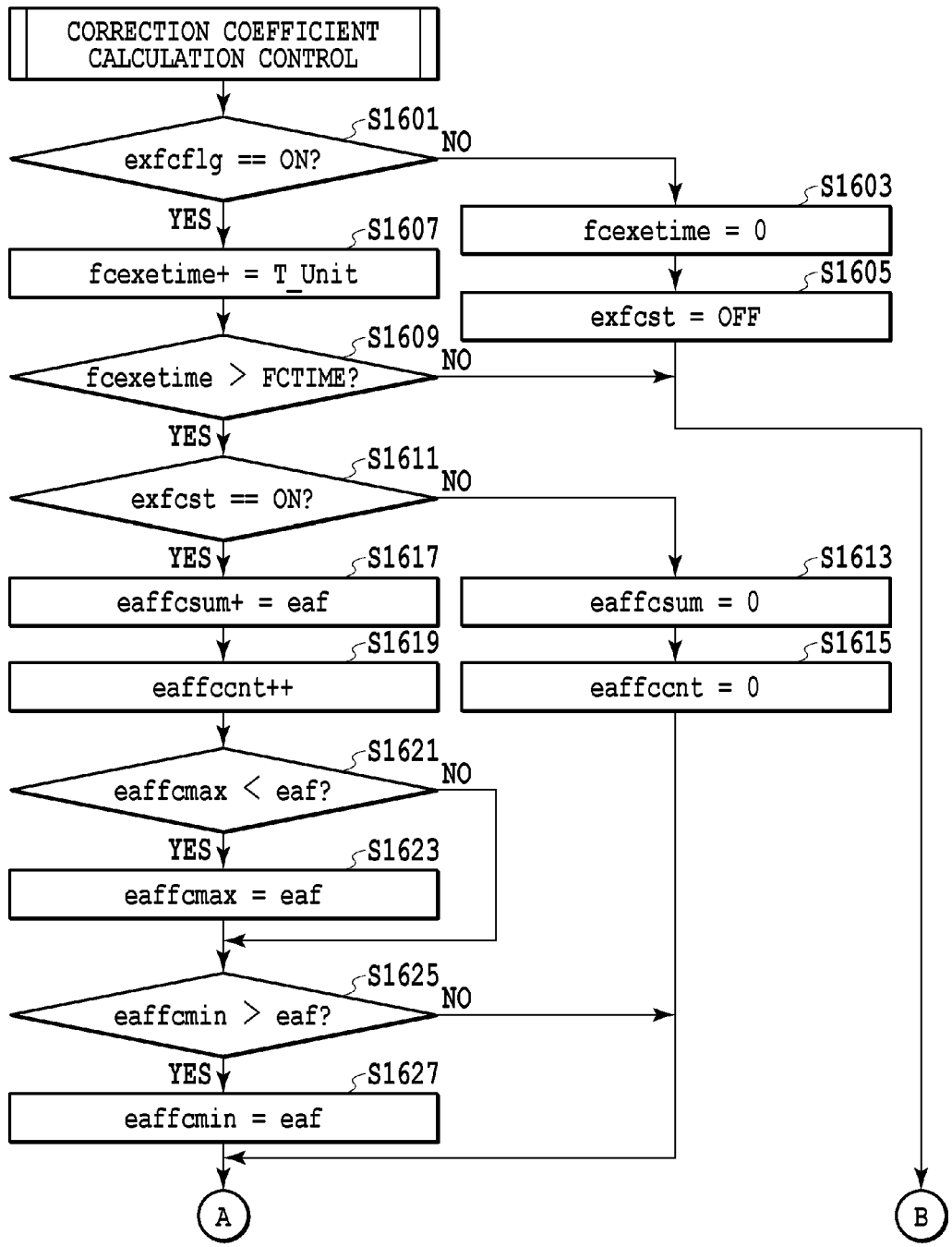
FIG. 16 is a flow chart showing a control routine in the first embodiment and shows a routine of correction coefficient calculation control.

Next, the routine of the correction coefficient calculation control, which corresponds to the process in S1403, will be described with reference to FIG. 16 and FIG. 17. Incidentally, with reference to FIG. 17, description will be given of an application example of sensitivity correction for the catalyst upstream sensor that is the air-fuel ratio sensor at a previous stage of the control routine of the first embodiment.

After the routine of the correction coefficient calculation control begins, first, it is determined whether or not a fuel-cut execution flag (FC execution flag) "exfcflg" is ON (step S1601). The FC execution flag "exfcflg" is a flag turned ON during fuel-cut operation, that is, during FC control, and it is controlled to switch between ON and OFF by the routine of the FC control as described above.

In a case where it is not determined that the FC execution flag "exfcflg" is ON in S1601, the correction coefficient "fck" is not calculated in the current setting, and thus, a time counter "fcexetime" that measures the duration of the FC control is set to zero (step S1603), and a permission flag "exfcst" is turned OFF (step S1605). Then, the current process is terminated. Incidentally, the permission flag "exfcst" is a flag turned ON when the duration of the FC control is longer than a predetermined time through the process in S1643 (described later), and turned OFF while the FC is not being performed.

On the other hand, in a case where it is determined that the FC execution flag "exfcflg" is ON in S1601, then, an FC execution time T_Unit is added to the time counter "fcexetime" (step S1607). The FC execution time T_Unit corresponds to an elapsed time from when the FC execution time T_Unit is added to the time counter "fcexetime" through the process in S1607 last time, to when the process in S1607 is performed again after the correction coefficient calculation control routine is started.

Then, it is determined whether or not the time counter "fcexetime" is larger than a predetermined time FCTIME (step S1609). The predetermined time FCTIME is a value appropriately set based on a duration of the FC operation presumably required to stably calculate the correction coefficient or the like and stored in the ECU 20. In a case where it is not determined that the time counter "fcexetime" is larger than the predetermined time FCTIME in S1609, the current process is temporarily terminated.

On the other hand, in a case where it is determined that the time counter "fcexetime" is larger than the predetermined time FCTIME in S1609, it is then determined whether or not the permission flag "exfcst" is ON (step S1611). In a case where it is not determined that the permission flag "exfcst" is ON, an output accumulated value "eaffcsum" in this cycle is set to zero (step S1613), and the number of accumulations of the output accumulated value "eaffccnt" is set to zero and initialized (step S1615).

On the other hand, in a case where it is determined that the permission flag "exfcst" is ON in S1611, then, the sensor output "eaf" is added to the output accumulated value "eaffcsum" (step S1617). Then, the accumulated count "eaffccnt" of the output accumulated value "eaffcsum" is incremented by one (step S1619). Incidentally, the accumulated count "eaffccnt" is a value counted by a counter which is set to zero in an initial state and counts the number of accumulations of the output accumulated value "eaffcsum" by adding one in each accumulation process in S1617.

Next, it is determined whether or not the current output "eaf" is larger than a maximum output value "eaffcmax" during FC in this cycle (step S1621). In a case where it is determined that the current output "eaf" is larger than the maximum output value "eaffcmax", the current output "eaf" is set as the maximum output value "eaffcmax" (step S1623).

In a case where it is not determined that the current output "eaf" is larger than the maximum output value "eaffcmax" in S1621 or after the maximum output value "eaffcmax" is updated in S1623, it is then determined whether or not the current output "eaf" is smaller than a minimum output value (step S1625). In a case where it is determined that the current output "eaf" is smaller than the minimum output value, the current output "eaf" is set as a minimum output value "eaffcmin" (step S1627).

Figure 17:
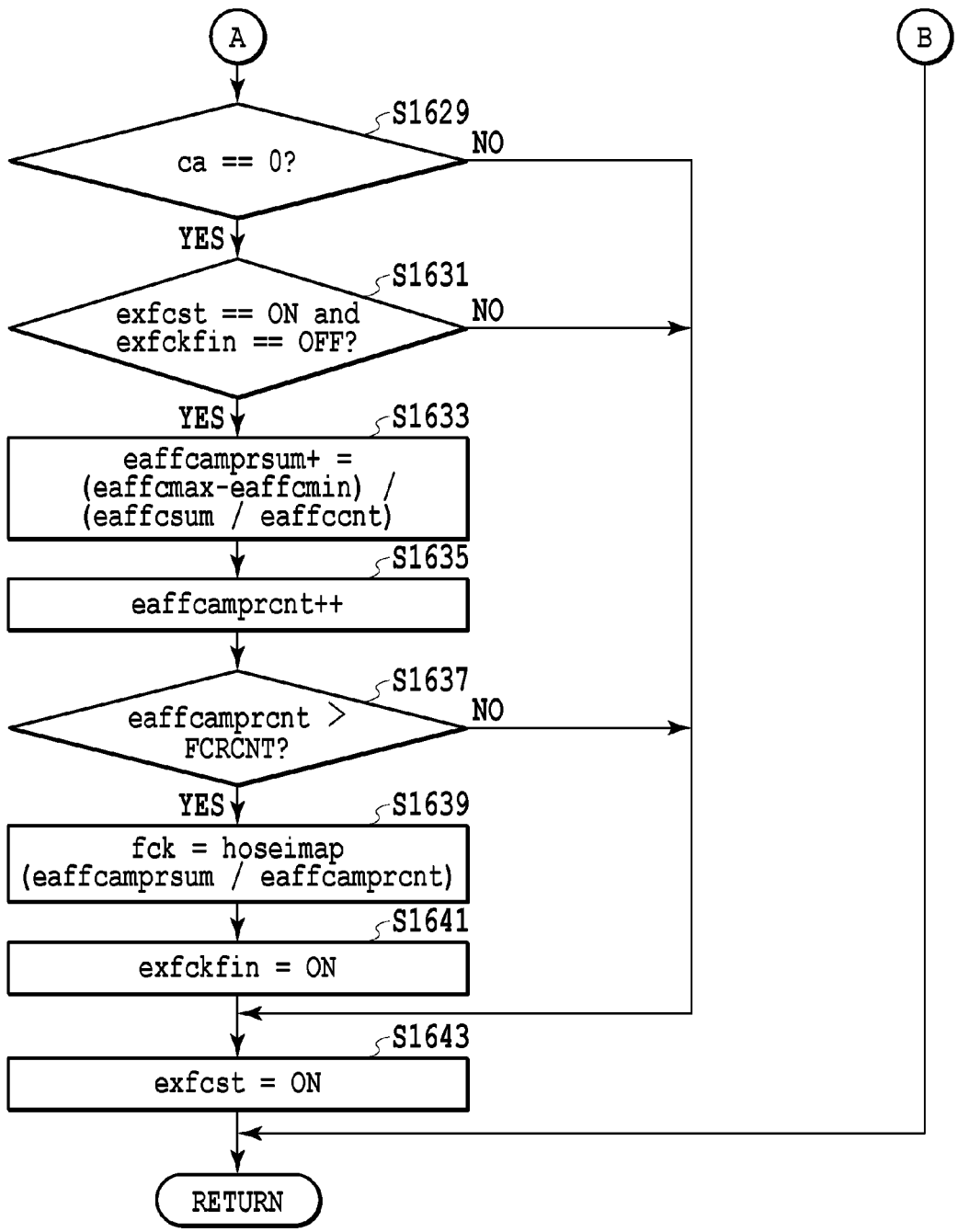
FIG. 17 is a flow chart which follows the flow chart of FIG. 16.

In a case where it is not determined that the current output "eaf" is smaller than the minimum output value "eaffcmin" in S1625, or in a case where the minimum output value "eaffcmin" is updated in S1627, or in a case where the accumulated count "eaffccnt" is set to zero in S1615, the process then proceeds to S1629 of the routine shown in FIG. 17, and it is determined whether the crank angle CA is zero.

In a case where it is determined that the crank angle CA is zero in S1629, it is then determined whether or not the permission flag "exfcst" is ON and a completion flag "exfckfin" is OFF (step S1631). The completion flag "exfckfin" is a flag turned ON through the process in S1641 (described later) when the calculation of the correction coefficient is completed. In a case where it is determined that the permission flag "exfcst" is ON and the completion flag "exfckfin" is OFF in S1631, it is determined that the correction coefficient is currently being calculated. Accordingly, next in S1633, the amplitude rate in the current cycle is accumulated into an FC amplitude rate accumulated value "eaffcamprsum". As the amplitude rate in the current cycle, a value (percentage) obtained by dividing a difference (eaffcmax−eaffcmin) between the maximum output value "eaffcmax" and the minimum output value "eaffcmin", that is, the amplitude, by the average output (eaffcsum/eaffccnt) is used. Then, an accumulated count "eaffcamprcnt" of the FC amplitude rate accumulated value "eaffcamprsum" is incremented (step S1635).

Next, it is determined whether or not the accumulated count "eaffcamprcnt" of the current amplitude rate is larger than a predetermined number FCRCNT (step S1637). The predetermined number FCRCNT is the number of times required for detecting the FC amplitude rate with greater accuracy, and the predetermined number FCRCNT is appropriately set.

In a case where it is determined that the accumulated count "eaffcamprcnt" is larger than the predetermined number in S1637, then in S1639, the correction coefficient "fck" is calculated. The correction coefficient "fck" is calculated based on the data or arithmetic expression corresponding to FIG. 12 in accordance with the average of the calculated FC amplitude rate accumulated value (eaffcamprsum/eaffcamprcut).

Next, the completion flag "exfckfin" is turned ON (step S1641). This indicates that the calculation of the current correction coefficient has been completed. After the completion flag "exfckfin" is turned ON, or in a case where it is not determined that the crank angle CA is zero in S1629, or in a case where it is determined that at least one of the fact that the permission flag "exfcst" is ON and the fact that the completion flag "exfckfin" is OFF is not identified in S1631, or in a case where it is not determined that the accumulated count "eaffcamprcnt" of the FC amplitude rate is larger than the predetermined number FCRCN in S1637, the detection of the FC amplitude rate for the calculation of the correction coefficient is ongoing. Accordingly, the permission flag "exfcst" is turned ON (step S1643), and the current process is terminated.

As described above with reference to FIG. 17, by using the output gradient "katamuki" corrected by using the correction coefficient "fck" in accordance with the amplitude rate during fuel-cut operation as a value representing a change in the air-fuel ratio (the amount of change in the output), it is possible to determine a variation abnormality in an air-fuel ratio between cylinders with greater accuracy.

Figure 18:
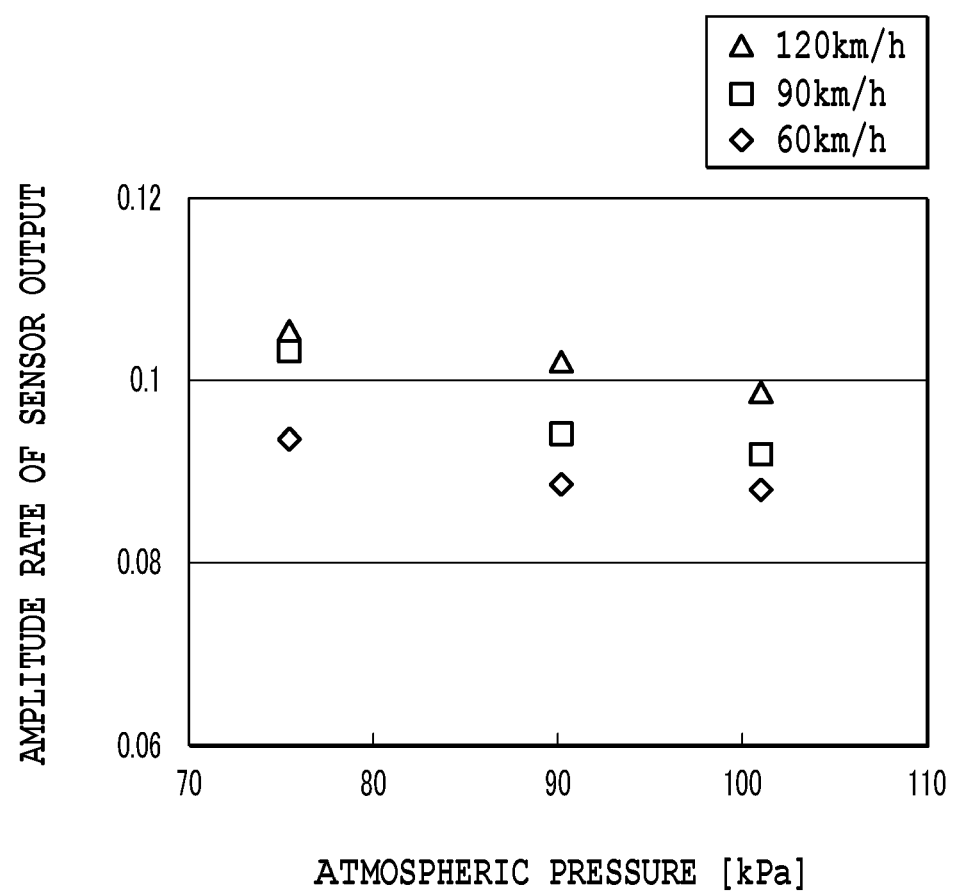
FIG. 18 is a graph of plots of an amplitude rate of the output of the catalyst upstream sensor with respect to outside atmospheric pressure.

The output of the catalyst upstream sensor 17 that is the air-fuel ratio sensor is affected by a decrease in outside atmospheric pressure in uplands or the like. FIG. 18 is a graph of plots of an amplitude rate of the output of the catalyst upstream sensor 17 during fuel-cut operation with respect to the outside atmospheric pressure. Speeds of 60 km/h, 90 km/h, and 120 km/h show vehicle speeds when the vehicle is switched to the fuel-cut operation. At any of the vehicle speeds, as the outside atmospheric pressure decreases, the amplitude rate of the sensor output tends to increase.

Figure 19:
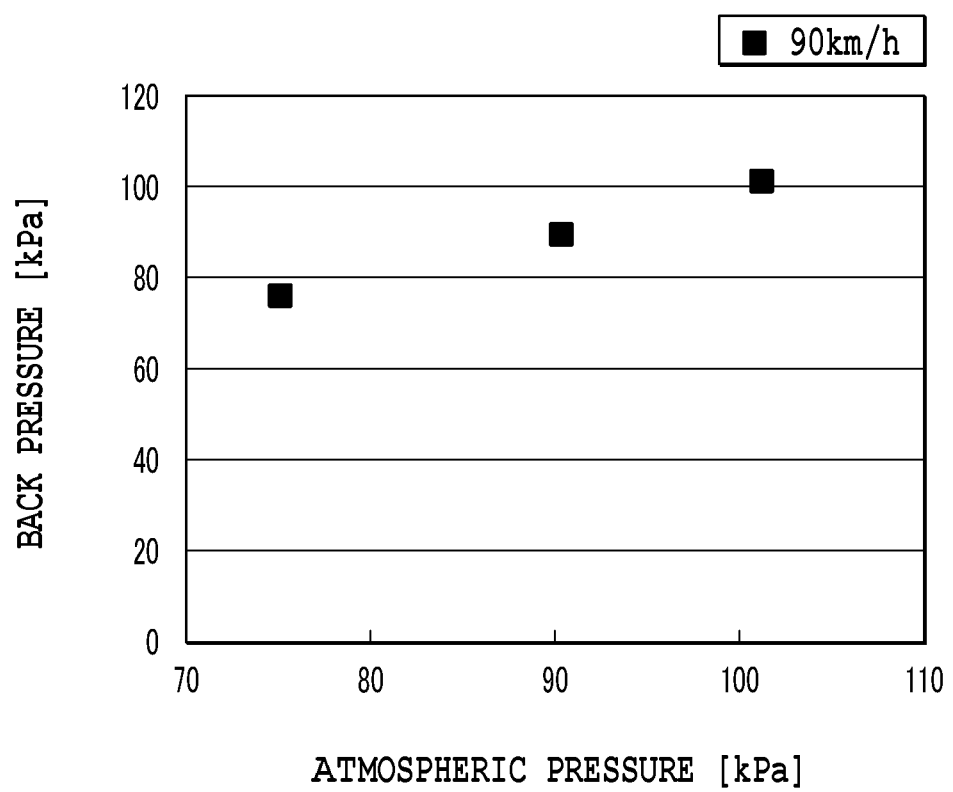
FIG. 19 is a graph showing the relationship between outside atmospheric pressure and back pressure which is a pressure in the exhaust passage during fuel-cut operation.
Figure 20:
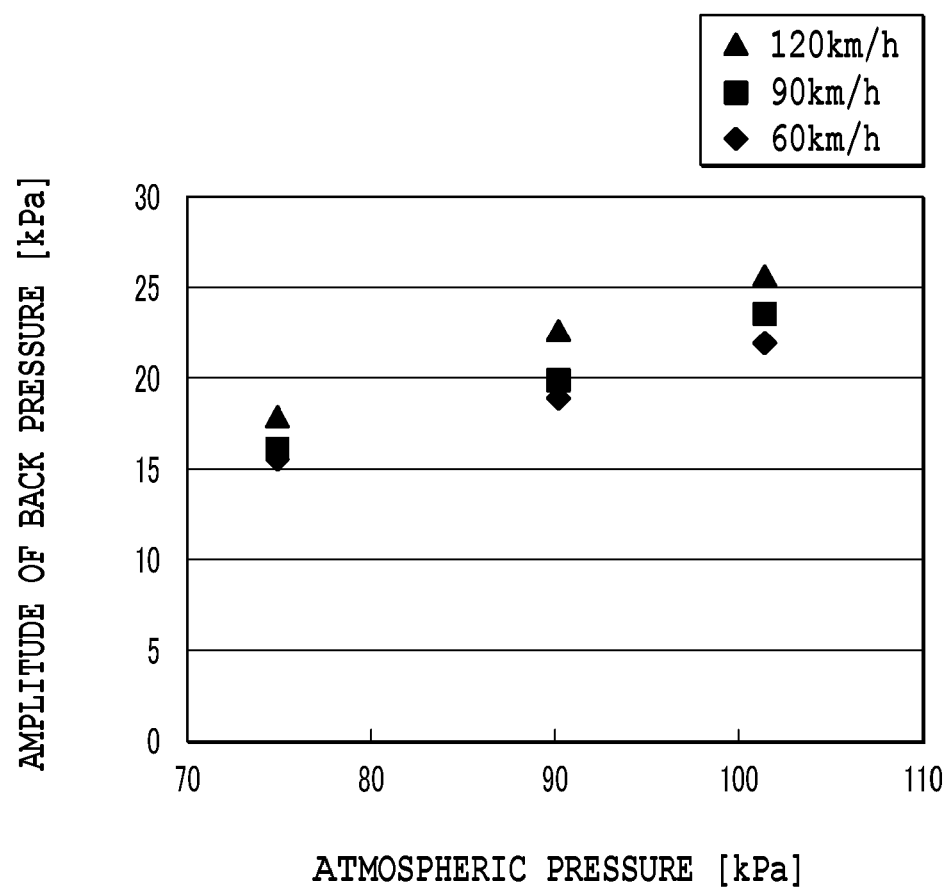
FIG. 20 is a graph showing the relationship between outside atmospheric pressure and an amplitude rate of back pressure.
Figure 21:
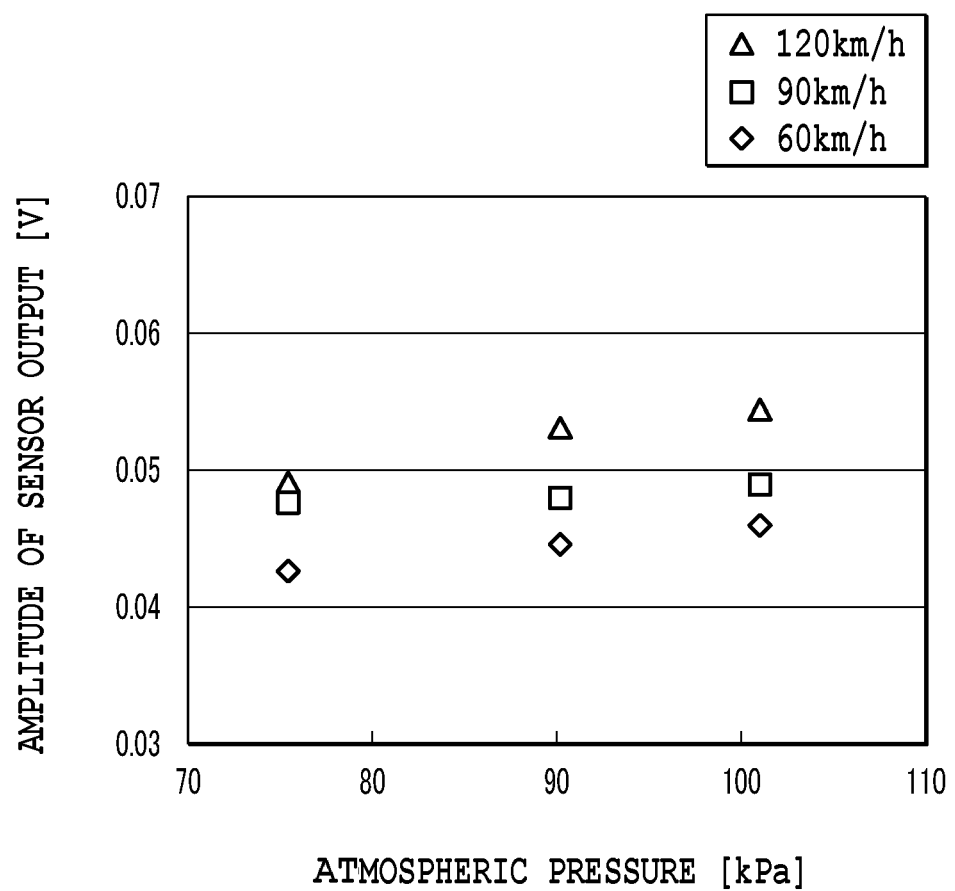
FIG. 21 is a graph showing the relationship between outside atmospheric pressure and an output amplitude of the air-fuel ratio sensor.

When the atmospheric pressure changes, the pressure (back pressure) of the exhaust passage during fuel-cut operation changes (see FIG. 19). Further, the output of the air-fuel ratio sensor has the property of depending on the pressure (see, for example, FIG. 8). Therefore, as the atmospheric pressure decreases and the average back pressure decreases, the output of the air-fuel ratio sensor decreases. Further, since the amplitude rate of the back pressure decreases as the back pressure decreases (see FIG. 20), the amplitude of the output of the air-fuel ratio sensor also decreases (see FIG. 21). Here, the percentage of the decrease in the average of the sensor output is larger than the percentage of the decrease in the amplitude of the output of the air-fuel ratio sensor. Therefore, the amplitude rate equivalent to the ratio (percentage) of the amplitude of the output of the air-fuel ratio sensor to the output average tends to increase as the outside pressure decreases, as shown in FIG. 18.

As the amplitude rate increases due to a low outside atmospheric pressure in uplands or the like, the correction coefficient calculated based on the data shown in FIG. 12 falls below the value calculated in normal atmospheric pressure (generally under one atmospheric pressure which is atmospheric pressure in sea level), and as a result, adequate correction in accordance with the sensitivity of the air-fuel ratio sensor as described with reference to FIG. 17 may fail. Accordingly, in the first embodiment, an outside atmospheric pressure correction coefficient is calculated according to outside atmospheric pressure so as to cancel (reduce or suppress) the influence of the outside atmospheric pressure, and correction in accordance with the sensitivity of the air-fuel ratio sensor is adequately performed based on the calculated outside atmospheric pressure correction coefficient. This makes it possible to detect a variation abnormality in an air-fuel ratio between cylinders with further greater accuracy. More specifically, the amplitude rate is corrected by using the outside atmospheric pressure correction coefficient calculated based on outside atmospheric pressure so that an amplitude rate equivalent to an amplitude rate in normal atmospheric pressure is calculated, and a variation abnormality in an air-fuel ratio between cylinders is detected by using the calculated amplitude rate as described above.

Figure 22:
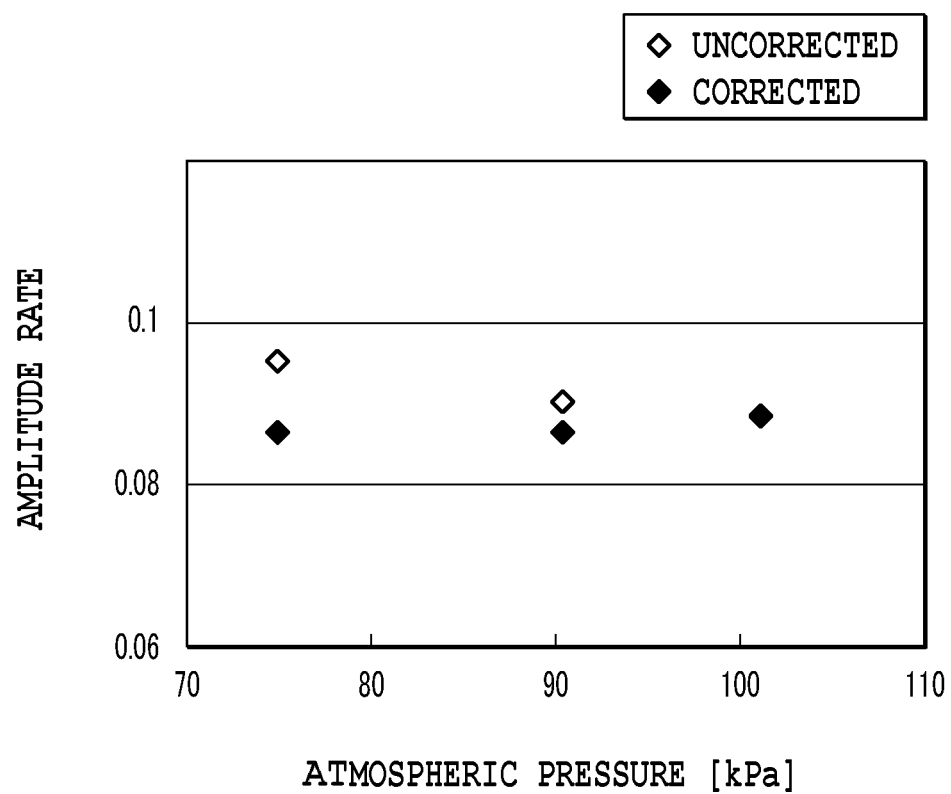
FIG. 22 is a graph of plots of an uncorrected amplitude rate and a corrected amplitude rate with respect to outside pressure.

Data or a predetermined arithmetic expression for calculating the outside atmospheric pressure correction coefficient is defined as to outside atmospheric pressure based on the experiment results shown in FIG. 18 and stored in the storage device of the ECU 20. As described above based on FIG. 18, the amplitude rate equivalent to a ratio of the amplitude of the output of the air-fuel ratio sensor to the output average tends to increase as the outside atmospheric pressure decreases. Accordingly, the outside atmospheric pressure correction coefficient is generally defined such that the lower the outside atmospheric pressure, the larger the difference between the uncorrected value and the corrected value, that is, the corrected amplitude rate is smaller than the uncorrected amplitude rate. FIG. 22 shows an (uncorrected)

amplitude rate calculated based on the output of the air-fuel ratio sensor when the vehicle is switched to fuel-cut operation at a vehicle speed of 60 km/h and a corrected amplitude rate as corrected by using the outside atmospheric pressure correction coefficient calculated by retrieving data or by a computation using an arithmetic expression stored based on outside atmospheric pressure. From FIG. 22, it can be understood that the correction by using an outside atmospheric pressure correction coefficient allows the amplitude rate in low outside atmospheric pressure to be close to or generally match the amplitude rate in normal atmospheric pressure.

Figure 23:
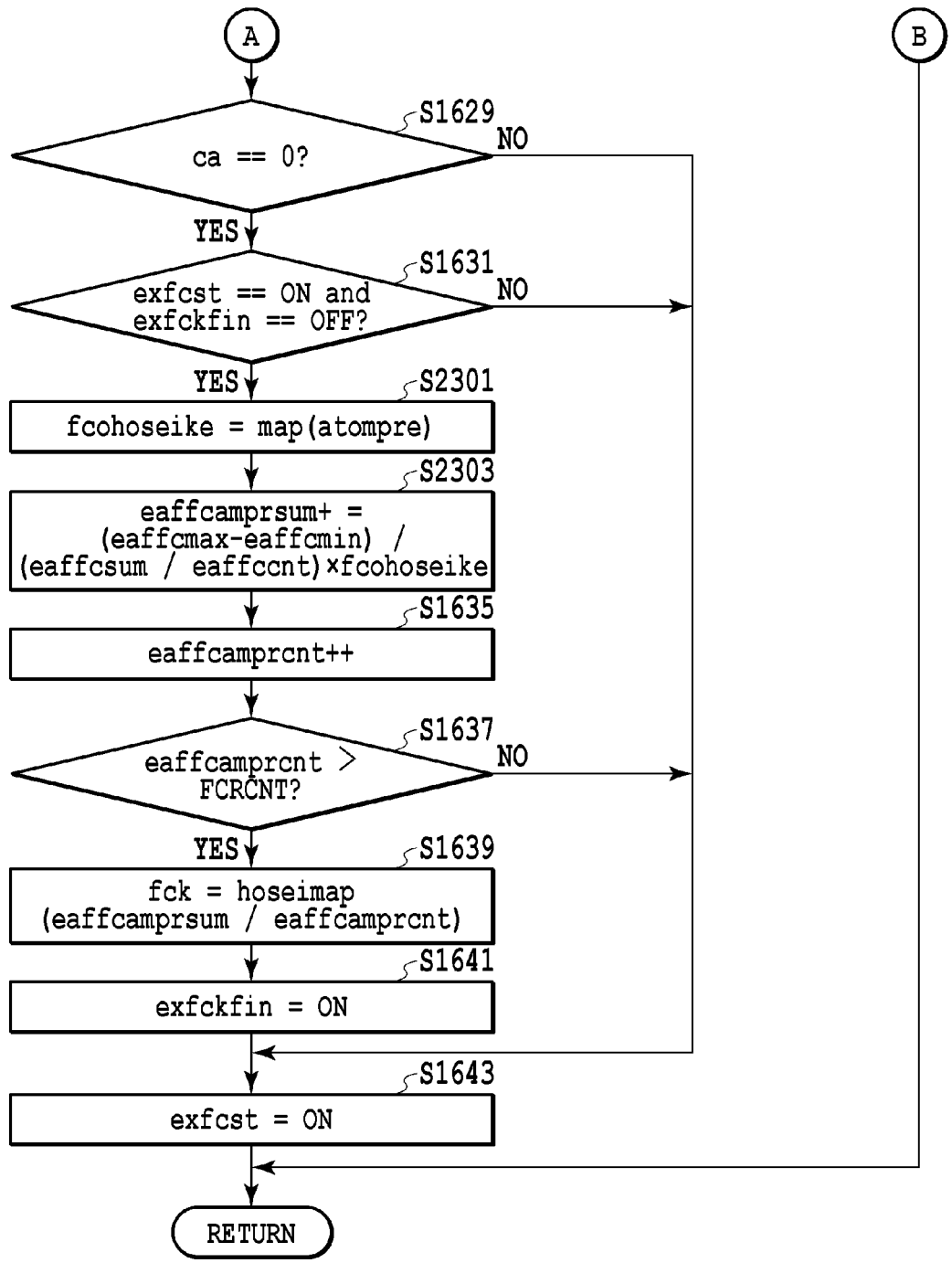
FIG. 23 is a flow chart showing a control routine in the first embodiment and shows a routine of correction coefficient calculation control, which follows the flow chart of FIG. 16.

FIG. 23 as to the first embodiment is a flow chart corresponding to FIG. 17 (already described), and includes S2301 and S2303 which replaces S1633 between S1631 (YES-side) and S1635 of FIG. 17. The processes other than those in S2301 and S2303 are already described above. Thus, only the processes of S2301 and S2303 will be described.

In a case where it is determined that the permission flag "exfcst" is ON and the completion flag "exfckfin" is OFF in S1631, an outside atmospheric pressure correction coefficient "fcohoseike" is calculated in S2301. First, data defined in advance based on the output of the intake pressure sensor 21 is retrieved or a predetermined computation is performed so as to detect the outside atmospheric pressure. Then, based on the detected outside atmospheric pressure, data on the outside atmospheric pressure correction coefficient defined and stored as to the outside atmospheric pressure is retrieved or a predetermined computation is performed so as to calculate the outside atmospheric pressure correction coefficient "fcohoseike". The data or predetermined computation preferably is based on the experiment results shown in FIG. 18. In this manner, the ECU 20 also functions as an outside atmospheric pressure correction coefficient calculation unit. In the present embodiment, the outside atmospheric pressure detection unit consists of the intake pressure sensor and part of the ECU 20. However, the present invention allows detection of the outside atmospheric pressure on the basis of the outputs of other sensor(s) such as the air flow meter 5.

Next, the amplitude rate in the current cycle is accumulated into the FC amplitude rate accumulated value "eaffcamprsum" in S2303. The amplitude rate in the current cycle is a value obtained by multiplying a value (a value calculated as the current amplitude rate in S1633) obtained by dividing a difference (eaffcmax−eaffcmin) between the maximum output value "eaffcmax" and the minimum output value "eaffcmin" by the average output (eaffcsum/eaffccnt) by the outside atmospheric pressure correction coefficient "fcohoseike" calculated in S2301. In other words, a value corrected by using the outside atmospheric pressure correction coefficient "fcohoseike" is accumulated into the FC amplitude rate accumulated value "eaffcamprsum" as the current amplitude rate. Then, the process proceeds to S1635.

Incidentally, the outside atmospheric pressure correction coefficient may be applied to (multiplied by) the correction coefficient calculated in S1639 as described with reference to FIG. 17. This also allows preferable correction of the gradient of the air-fuel ratio sensor to detect a variation abnormality in an air-fuel ratio between cylinders.

In the above embodiment, an amplitude rate is calculated based on the output of the air-fuel ratio sensor (catalyst upstream sensor 17) during fuel-cut operation, and a value representing a change in the air-fuel ratio is corrected based on the calculated amplitude rate. Instead of the amplitude rate, however, it is also possible to use another value representing a change in the output of the air-fuel ratio sensor during fuel-cut operation. For example, it is possible to use a difference between a maximum output value and a minimum output value of the air-fuel ratio sensor (which may be also referred to as "output amplitude") in a predetermined period of time (for example, one engine cycle). Alternatively, it is possible to use the difference ΔA/F (gradient) calculated as described above based on the output of the air-fuel ratio sensor during fuel-cut operation as a value representing a change in the output of the air-fuel ratio sensor during fuel-cut operation, and calculate a correction coefficient based on the calculated value to correct the value representing a change in the air-fuel ratio. The calculation of the value representing a change in the output of the air-fuel ratio sensor during fuel-cut operation (an output change value of the air-fuel ratio sensor during fuel-cut operation) is performed by the ECU 20 which functions as a calculation unit configured to calculate an output change value of the air-fuel ratio sensor during fuel-cut operation.

Next, a second embodiment of the present invention will be described. The engine of the second embodiment has generally the same configuration as the engine 1 of the first embodiment. Since the reference numerals corresponding to those of the first embodiment will be used, description of the configuration of the engine of the second embodiment will be omitted.

In the first embodiment, the sensitivity correction in accordance with the sensitivity of the catalyst upstream sensor 17 (air-fuel ratio sensor) based on the output of the sensor during fuel-cut operation and the outside atmospheric pressure correction based on the outside atmospheric pressure are performed to the value representing a change in the air-fuel ratio calculated based on the output of the catalyst upstream sensor 17. In the second embodiment, however, the sensitivity correction and the outside atmospheric pressure correction are performed to a threshold "Threshold" for determining a variation abnormality in an air-fuel ratio between cylinders.

Figure 24:
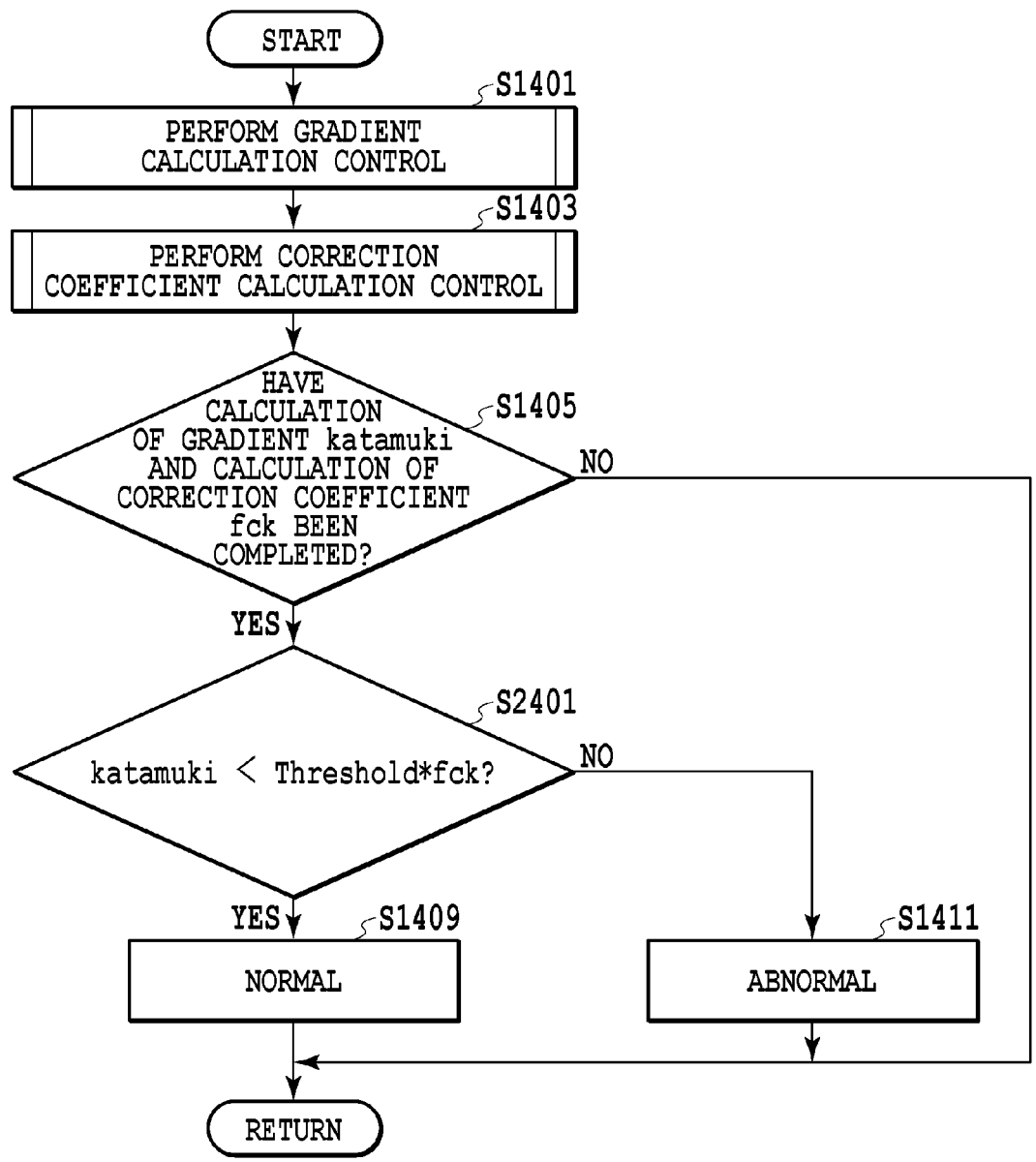
FIG. 24 is a flow chart showing a control routine in a second embodiment.

With reference to FIG. 24, a routine of control executed by the ECU 20 in the second embodiment will be described. The flow chart of FIG. 24 corresponds to the flow chart of FIG. 14 in the first embodiment, and includes S2401 instead of S1407 of FIG. 14. Incidentally, the processes in FIG. 24 other than the process of S2401 are already described based on FIG. 14. Thus, description of the processes in FIG. 24 other than the process of S2401 will be omitted.

In FIG. 24, the gradient calculation control in S1401 is performed as already described based on FIG. 15. The correction coefficient calculation control in S1403 is performed as already described based on FIG. 16 and FIG. 23. The process of S1639 will be described later.

In a case where it is determined that the calculation of the output gradient "katamuki" and the calculation of the correction coefficient "fck" have been completed in S1405, the process proceeds to S2401. In S2401, it is determined whether or not the calculated output gradient "katamuki" is smaller than a corrected value (Threshold×fck) of the determination threshold "Threshold" as corrected by using the correction coefficient "fck". In a case where it is determined that the output gradient is smaller than the corrected determination threshold, it is determined that a variation in an air-fuel ratio between cylinders is normal, that is, there is no variation abnormality in an air-fuel ratio between cylinders (step S1409). On the other hand, in a case where it is not determined that the output gradient is smaller than the corrected determination threshold "Threshold", it is determined that a variation in an air-fuel ratio between cylinders is abnormal, that is, there is a variation abnormality in an air-fuel ratio between cylinders (step S1411).

In this manner, the sensitivity correction and the outside atmospheric pressure correction are both performed to a threshold (a predetermined value) for determining a variation abnormality in an air-fuel ratio between cylinders in the second embodiment. Thus, the data or arithmetic expression for calculating the correction coefficient "fck" in S1639 of FIG. 23 is defined for the correction of the determination threshold. Accordingly, the calculation of the correction coefficient in the second embodiment is performed in the same manner as described above based on FIG. 16 and FIG. 23. The process in S1639 in the second embodiment uses mapped data or an arithmetic expression that is different from those used in S1639 in the first embodiment.

In this manner, the sensitivity correction and the outside atmospheric pressure correction may be performed to either of the output gradient calculated for determining a variation abnormality in an air-fuel ratio between cylinders and the determination threshold. Alternatively, one of the sensitivity correction and the outside atmospheric pressure correction may be performed to the output gradient, and the other of the sensitivity correction and the outside atmospheric pressure correction may be performed to the determination threshold. Note that in the second embodiment, various changes and modifications as described in the first embodiment can be made if not contradictory.

While preferred embodiments of the present invention have been described, the present invention is not limited to these embodiments. The present invention embraces various modifications and applications or equivalents included in the concept of the present invention as defined by the claims.

What is claimed is:

1. An apparatus for detecting a variation abnormality in an air-fuel ratio between cylinders in an internal combustion engine having a plurality of cylinders, the apparatus comprising:
an air-fuel ratio change value calculation unit configured to calculate a value representing a change in an air-fuel ratio based on an output of an air-fuel ratio sensor that is provided in an exhaust passage in a predetermined operating state in which fuel is injected from a fuel injection valve;
a sensitivity correction unit configured to perform sensitivity correction in according with a sensitivity of the air-fuel ratio sensor based on an amplitude rate which is a ratio of an amplitude value of the output of the air-fuel ratio sensor during fuel-cut operation to an output average value of the amplitude value in a predetermined period;
an outside atmospheric pressure detection unit configured to detect outside atmospheric pressure;
an outside atmospheric pressure correction unit configured to perform outside atmospheric pressure correction based on the outside atmospheric pressure detected by the outside atmospheric pressure detection unit; and
a determination unit configured to determine the presence or absence of a variation abnormality in an air-fuel ratio between cylinders by comparing the value calculated by the air-fuel ratio change value calculation unit with a predetermined value, while performing the sensitivity correction by the sensitivity correction unit and the outside atmospheric pressure correction by the outside atmospheric pressure correction unit,
wherein the outside atmospheric pressure correction unit is configured to perform the outside atmospheric pressure correction such that the lower the outside atmospheric pressure, the larger the difference between an uncorrected value and a corrected value.

2. The apparatus for detecting the variation abnormality in the air-fuel ratio between cylinders according to claim 1, wherein the determination unit compares the value calculated by the air-fuel ratio change value calculation unit with the predetermined value, the calculated value being corrected through the outside atmospheric pressure correction and the sensitivity correction.

3. The apparatus for detecting the variation abnormality in the air-fuel ratio between cylinders according to claim 1, wherein the determination unit compares the value calculated by the air-fuel ratio change value calculation unit with the predetermined value, the predetermined value being corrected through the outside atmospheric pressure correction and the sensitivity correction.

4. The apparatus for detecting the variation abnormality in the air-fuel ratio between cylinders according to claim 1, wherein the sensitivity correction unit is configured to perform the sensitivity correction such that the smaller the sensitivity of the air-fuel ratio sensor, the larger the difference between an uncorrected value and a corrected value.

* * * * *